United States Patent
Hattori

(10) Patent No.: US 10,919,248 B2
(45) Date of Patent: Feb. 16, 2021

(54) PRESS BRAKE

(71) Applicant: Murata Machinery, Ltd., Kyoto (JP)

(72) Inventor: Katsumasa Hattori, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 147 days.

(21) Appl. No.: 16/343,693

(22) PCT Filed: Sep. 28, 2017

(86) PCT No.: PCT/JP2017/035203
§ 371 (c)(1),
(2) Date: Apr. 19, 2019

(87) PCT Pub. No.: WO2018/079175
PCT Pub. Date: May 3, 2018

(65) Prior Publication Data
US 2019/0255791 A1  Aug. 22, 2019

(30) Foreign Application Priority Data

Oct. 27, 2016  (JP) ................. 2016-210724

(51) Int. Cl.
*B30B 1/18* (2006.01)
*B30B 15/14* (2006.01)
(Continued)

(52) U.S. Cl.
CPC ............... *B30B 1/186* (2013.01); *B21D 5/02* (2013.01); *B30B 1/18* (2013.01); *B30B 1/181* (2013.01);
(Continued)

(58) Field of Classification Search
CPC ........... B30B 1/18; B30B 1/181; B30B 1/186; B30B 15/142; B30B 15/161;
(Continued)

(56) References Cited

U.S. PATENT DOCUMENTS 7,353,686 B2 * 4/2008 Kanemitsu ............... B30B 1/18
100/43
7,415,862 B2 * 8/2008 Futamura ............... B30B 1/186
100/231

(Continued)

FOREIGN PATENT DOCUMENTS

JP     4-75798 A    3/1992
JP     5-28588 U    4/1993

(Continued)

*Primary Examiner* — Jimmy T Nguyen
(74) *Attorney, Agent, or Firm* — DLA Piper LLP (US)

(57) ABSTRACT

A press brake includes a ram to which an upper or lower tool can be attached; a movable ram driver; and a controller that controls the ram driver, wherein the ram driver includes a rotation/linear motion converter composed of a screw fixed to the ram and moves upward and downward as the ram moves upward and downward, and a nut screw-coupled with the screw; a drive rotation body arranged rotatably about a rotation axis of the nut; a first motor arranged in a fixed state; a first power transmitter that transmits rotation of the first motor to the nut at high speed and with low torque; a second motor arranged in a fixed state; a second power transmitter that transmits rotation of the second motor to the drive rotation body at low speed and with high torque; and a clutch provided between the nut and the drive rotation body.

18 Claims, 14 Drawing Sheets

(51) Int. Cl.
*B30B 15/16* (2006.01)
*F16H 25/24* (2006.01)
*B21D 5/02* (2006.01)

(52) U.S. Cl.
CPC .......... *B30B 15/142* (2013.01); *B30B 15/161* (2013.01); *F16H 25/24* (2013.01)

(58) Field of Classification Search
CPC ... B30B 15/0035; B30B 15/0041; B21D 5/02; B21D 5/0272; F16H 25/24; F16H 25/2204; F16H 2025/2053; F16H 2025/2081
See application file for complete search history.

(56) References Cited

U.S. PATENT DOCUMENTS

| | | | |
|---|---|---|---|
| 7,574,891 B2* | 8/2009 | Futamura | B30B 1/18 100/280 |
| 9,138,794 B2* | 9/2015 | Imaeda | B30B 15/068 |
| 2005/0204798 A1* | 9/2005 | Imaeda | B30B 1/18 72/443 |
| 2016/0243778 A1 | 8/2016 | Imaeda et al. | |

FOREIGN PATENT DOCUMENTS

| | | |
|---|---|---|
| JP | 2003-200221 A | 7/2003 |
| JP | 2004-98105 A | 4/2004 |
| WO | 2015/049930 A1 | 4/2015 |

* cited by examiner

PRESS BRAKE

TECHNICAL FIELD

This disclosure relates to a press brake.

BACKGROUND

Conventionally, there has been proposed a press brake that moves an upper tool upward and downward by using relative rotational motion of a screw and a nut of a ball screw (for example, see International Publication No. 2015/049930). In the press brake disclosed in International Publication No. 2015/049930, the screw is coupled with a high-speed drive source that generates low torque at high speed, and the nut is coupled with a pressure drive source that generates high torque at low speed. The screw is coupled with, via a co-rotation preventing mechanism, the ram that includes a holder supporting the upper tool. The nut is screw-coupled with the screw, and the vertical movement thereof is restricted.

In this press brake, when approaching a workpiece, the ram (the upper tool) is lowered at high speed (with low torque) to a predetermined position immediately before the upper tool comes in contact with the workpiece, by rotating the screw by the high-speed drive source in the state where the rotation of the nut is locked by the pressure drive source. When the upper tool reaches this predetermined position, after stopping the driving of the high-speed drive source, the high-speed drive source locks the rotation of the screw and the pressure drive source rotates the nut to lower the screw with high torque (at low speed), to thereby sandwich the workpiece with the upper tool and the lower tool and perform bending work. When rotating the nut by the pressure drive source, the high-speed drive source of low torque is unable to prevent co-rotation of the screw and, therefore, a co-rotation preventing mechanism that locks the screw is included in some examples so that the screw does not co-rotate.

In the press brake of International Publication No. 2015/049930, it is necessary that the pressure drive source is fixed to a frame or the like and the high-speed drive source is moved in accordance with the vertical movement of the screw and, accordingly, a movement guiding mechanism is provided. As mentioned above, in the press brake in which the high-speed drive source and the pressure drive source move relative to each other, a guiding mechanism that guides one of the drive sources is required, and this leads to complexity in the overall configuration of the press brake and an increase in cost is brought about. Since the press brake of International Publication No. 2015/049930 uses the high-speed drive source when approaching the workpiece and uses the pressure drive source to perform work on a workpiece, switching between the drive sources is time consuming and the length of time required to perform work on a workpiece is long. Also, since only the pressure drive source is used to perform work on the workpiece, it is necessary to use a large-scale (high-power) pressure drive source, which leads to an increase in cost.

It could therefore be helpful to provide a press brake capable of suppressing an increase in cost by eliminating relative positional changes between a first motor and a second motor and simplifying a configuration, and that enables reduction in time required to perform work on a workpiece and miniaturization of the second motor.

SUMMARY

My press brake performs bending work on a workpiece by holding the workpiece between an upper tool and a lower tool, the press brake comprising: a ram to which the upper tool or the lower tool can be attached; a ram driver that moves the ram upward and downward; and a controller that controls the ram driver, wherein the ram driver includes: a rotation/linear motion converter composed of a screw fixed to the ram and that moves upward and downward as the ram moves upward and downward, and a nut screw-coupled with the screw; a drive rotation body arranged apart from the nut in an axial direction of the screw and arranged rotatably about a rotation axis of the nut; a first motor arranged in a fixed state; a first power transmitter that transmits rotation of the first motor to the nut at high speed and with low torque; a second motor arranged in a fixed state; a second power transmitter that transmits rotation of the second motor to the drive rotation body at low speed and with high torque; and a clutch provided between the nut and the drive rotation body and that couples the nut and the drive rotation body into an integrated rotation body.

The controller may include a synchronous rotation controller that controls the first motor so that the upper tool or the lower tool descends within a range that includes at least a part of an approaching-workpiece stroke among strokes including the approaching-workpiece stroke, a contacting-workpiece stroke, and an ending-bending-work stroke, and that matches a rotation speed of the nut being rotated by the first motor with a rotation speed of the drive rotation body being rotated by the second motor, during the approaching stroke to couple the nut and the drive rotation body by the clutch after the synchronous rotation controller has matched the rotation speed of the nut with the rotation speed of the drive rotation body. The synchronous rotation controller may control the first motor so that the rotation speed of the nut is reduced to the rotation speed of the drive rotation body being rotated or scheduled to be rotated at low speed by the second motor.

The drive rotation body may be such that: it has an accommodating part that accommodates at least a part of the nut; an outer circumferential part thereof is a power receiver that receives power transmitted from the second power transmitter; and an inner circumferential part thereof is opposed to a part of an outer circumferential part of the nut via a bearing, and the drive rotation body may be rotatably supported in an axial direction thereof via a reaction force receiver held on a frame arranged in a fixed state. The controller may have a use/non-use selector that selects between use and non-use of the clutch.

The clutch may couple the nut and the drive rotation body by reaction force generated when work is performed on a workpiece. The clutch may include a driver that moves at least one of the nut and the drive rotation body that are apart from each other to couple the nut and the drive rotation body.

The press brake performs bending work on a workpiece by holding the workpiece between an upper tool and a lower tool, the press brake comprising: a ram to which the upper tool or the lower tool can be attached; a frame installed on a floor surface and that guides the ram in a vertical direction; a ram driver that moves the ram upward and downward; and a controller that controls the ram driver, wherein the ram driver includes: a rotation/linear motion converter such that it is composed of a screw and a nut screw-coupled with the screw, one of the screw and the nut is fixed to the ram, and the other one of the screw and the nut is fixed to the frame; a first motor fixed to the ram or the frame; a second motor fixed to the ram or the frame, to which the first motor is fixed; a drive rotation body arranged apart from the nut or the screw rotated by the first motor in an axial direction of the screw while being able to rotate about a rotation axis of the nut or the screw, and rotated by the second motor; and a clutch provided between the nut or the screw rotated by the first motor and the drive rotation body, and that couples the nut or the screw and the drive rotation body into an integrated rotation body.

When one or both of the first motor and the second motor are driven, the relative position therebetween is maintained so that there is no need for a guiding mechanism that guides one of the first motor and the second motor. With such a configuration, it is possible to suppress the entire configuration from becoming complex and thereby suppress an increase in cost. Since the nut (screw) rotated by the first motor and the drive rotation body rotated by the second motor are coupled by the clutch, it is possible to smoothly perform work from a process of approaching to a workpiece to a process of bending work, and thereby reduce the length of time required to perform the work on the workpiece. Since both the first motor and the second motor can be used at the time of performing work on a workpiece, it is possible to miniaturize the second motor that rotates the drive rotation body.

When the controller controls the first motor so that the upper tool or the lower tool descends within a range that includes at least a part of the approaching-workpiece stroke among the strokes including the approaching-workpiece stroke, the contacting-workpiece stroke, and the ending-bending-work stroke, and where the nut and the drive rotation body are coupled by the clutch after the above synchronous rotation controller has matched, during the approaching stroke, the rotation speed of the nut being rotated by the first motor with the rotation speed of the drive rotation body being rotated by the second motor, it is unnecessary to stop both the nut and the drive rotation body when coupling the nut and the drive rotation body, and it is possible to smoothly couple the nut and the drive rotation body by matching the rotation speed of the nut with the rotation speed of the drive rotation body, by the synchronous rotation controller. When the synchronous rotation controller controls the first motor so that the rotation speed of the nut is reduced to the rotation speed of the drive rotation body being rotated or scheduled to be rotated at low speed by the second motor, it is possible to couple the nut and the drive rotation body by the clutch in a short period of time without rotating the drive rotation body at high speed by the second motor.

When the drive rotation body is such that it has an accommodating part that accommodates at least a part of the nut; an outer circumferential part thereof is a power receiver that receives power transmitted from the second power transmitter; and an inner circumferential part thereof is opposed to a part of an outer circumferential part of the nut via a bearing, and the drive rotation body is rotatably supported in an axial direction thereof via a reaction force receiver held on a frame arranged in a fixed state since a part of the nut is accommodated in the accommodating part, it is possible to suppress displacement of the rotation axis between the drive rotation body and the nut. Furthermore, by receiving reaction force at the time of performing work on a workpiece by the reaction force receiver to restrict the screw from moving in the axial direction, it is possible to accurately perform the bending work on the workpiece. When the controller has a use/non-use selector that selects between use and non-use of the clutch, it is possible to arbitrarily select workpiece bending work with use of rotation of the drive rotation body and rotation of the nut, or workpiece bending work with use of rotation of the nut only.

When the clutch couples the nut and the drive rotation body by reaction force generated when work is performed on a workpiece, there is no need for a drive source to drive the clutch, and product cost can be reduced. When the clutch includes a driver that moves at least one of the nut and the drive rotation body that are apart from each other, to couple the nut and the drive rotation body, it is possible, with the driver, to reliably couple the nut and the drive rotation body by the clutch, and the timing of coupling can be arbitrarily set.

DESCRIPTION OF REFERENCE SIGNS

Figure 1:
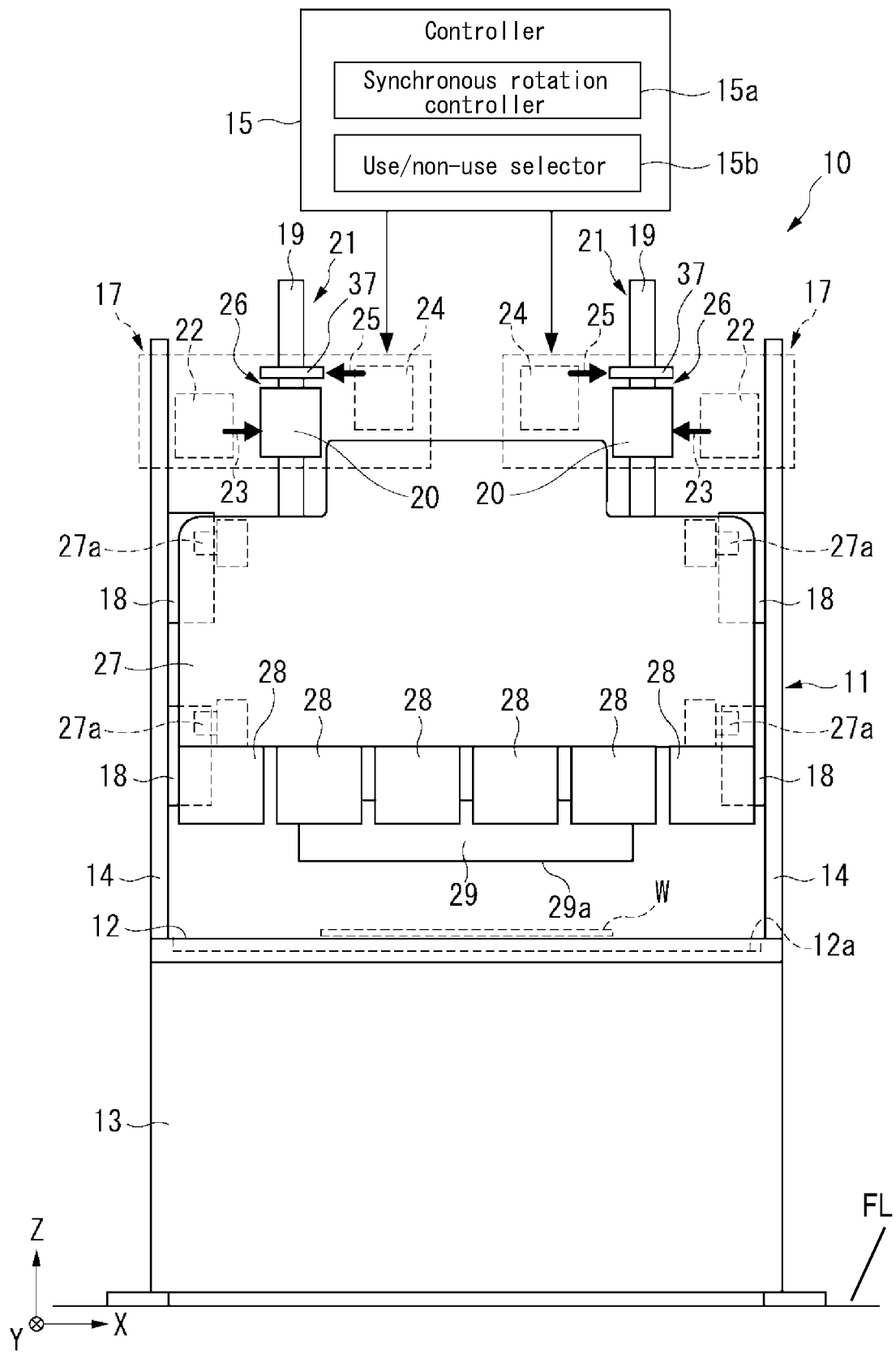
FIG. 1 is a front elevation view showing an example of a press brake according to a first example.

W Workpiece
FL Floor surface
R Rotation body
10, 110, 210, 310, 410, 510 Press brake
11 Frame
12 Lower tool
15 Controller
15a Synchronous rotation controller
15b Use/non-use selector
17, 117, 217, 317, 417, 517 Ram driver
19, 219, 319 Screw
20, 320 Nut
21, 321 Ball screw (rotation/linear motion converter)
22 First motor
24 Second motor
26, 126, 326 Clutch
27 Ram
29 Upper tool
37, 337 Drive rotation body
37c, 337c Thrust bearing (reaction force receiver)
40, 340 Case

62 Driver
63 Sensor
65 Spline nut (rotation preventer)
219*a* Spline (rotation preventer)
337*d* Elastic member

DETAILED DESCRIPTION

The following describes examples with reference to the drawings. However, this disclosure is not limited to the examples. In the drawings, scale is changed as necessary to illustrate the examples such as by enlarging or by emphasizing a part. In the following drawings, an XYZ coordinate system is sometimes used to describe directions in each drawing. In the XYZ coordinate system, the vertical direction is taken as the Z direction, and the horizontal directions are taken as the X direction and the Y direction. The X direction is a left-right direction, and the Y direction is a front-rear direction. For each of the X direction, the Y direction, and the Z direction, description is made with a definition in which a direction indicated by an arrow is the positive (+) direction and a direction opposite to the direction indicated by the arrow is the negative (−) direction. To facilitate viewing, there are some hatched portions in the figures to indicate portions showing a cross section.

FIRST EXAMPLE

Figure 2:
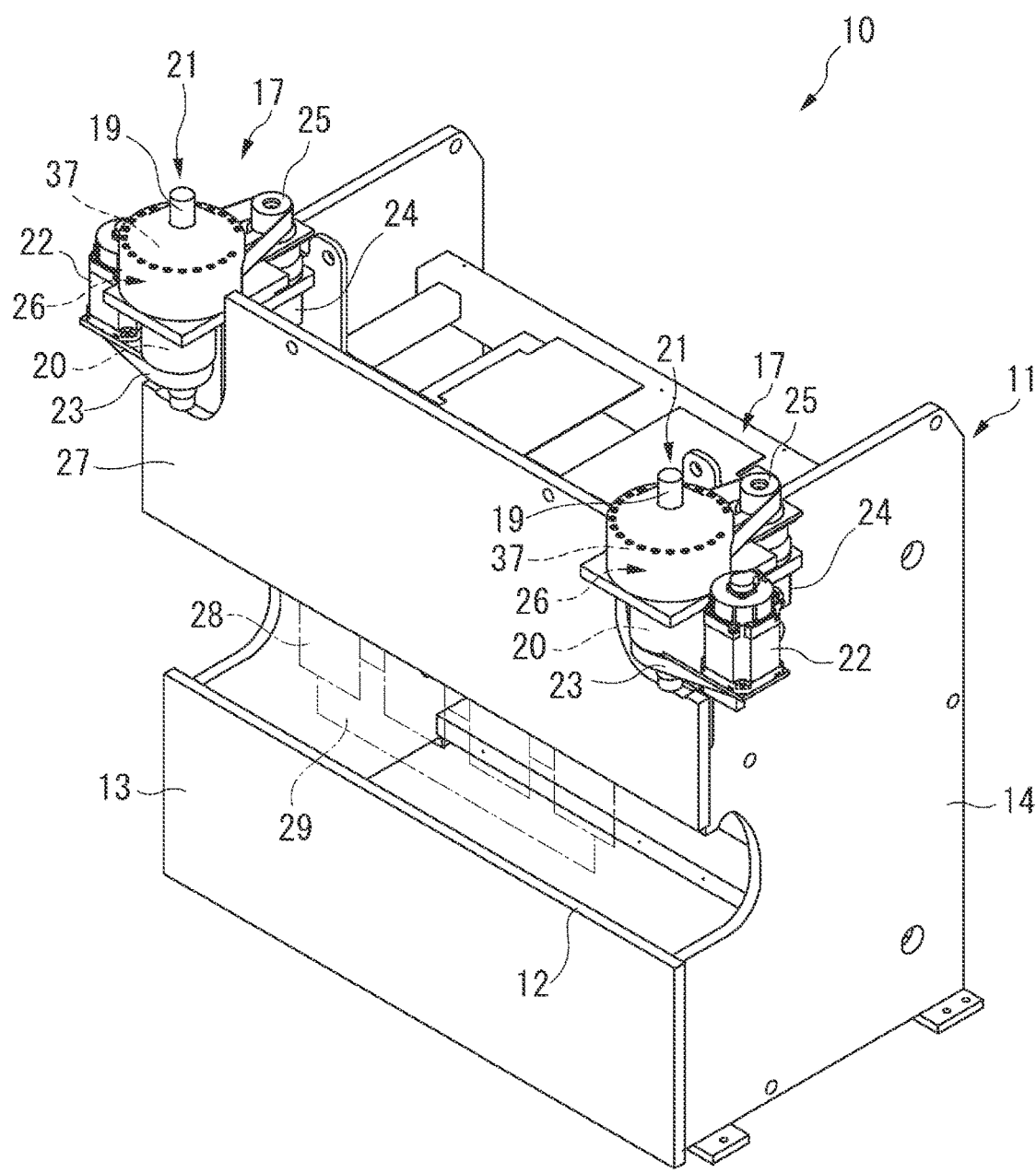
FIG. 2 is a perspective view showing the press brake of the first example.

FIG. 1 is a front elevation view showing an example of a press brake 10. FIG. 2 is a perspective view showing the press brake 10. As shown in FIGS. 1 and 2, the press brake 10 of this example includes a frame 11 and a table 13 that supports a lower tool 12. The frame 11 includes a pair of side plates 14 and forms an outer framework of the press brake 10. The frame 11 is installed on a floor surface FL.

The lower tool 12 is a fixed side (lower side) tool, and is formed elongated in the left-right direction. The lower tool 12 has a recess 12*a* for shape forming. The table 13 is attached to a front side (a −Y side) of the frame 11 and fixes the lower tool 12. The side plates 14 are respectively arranged on the left and right side parts of the frame 11. Guide plates 18 projecting inward are formed at two positions, an upper position and a lower position, on each of the side plates 14. An upper cover plate not shown in the drawings is attached to a front side between the pair of side plates 14.

A ram 27 is arranged between the left and right side plates 14. The ram 27 is, for example, a plate-shaped member formed of a metal or the like and has a weight of several tens of kg to several hundreds of kg. In the ram 27 there are formed rollers 27*a* that each sandwich the guide plate 18. The rollers 27*a* are guided by the guide plates 18, thereby guiding the ram 27 in the vertical direction. A plurality of upper tool holders 28 are attached on a lower side of the ram 27 at constant intervals in the left-right direction. Each upper tool holder 28 has a clamp that sandwiches and holds the upper tool 29. The ram 27 and the upper tool holders 28 are not limited to the configurations shown in the drawings, and any other arbitrary configuration may be applied thereto. When held by the upper tool holders 28, the upper tool 29 is positioned to oppose to the recess 12*a* of the lower tool 12. Moreover, the upper tool 29 has a distal end part 29*a* that enters the recess 12*a* of the lower tool 12. The ram 27, the upper tool holders 28, and the upper tool 29 form a structure that moves vertically together with screws 19 described later.

The press brake 10 includes a pair of left and right ram drivers 17. The two ram drivers 17 each have the same configuration and are each arranged on a rear side of the upper cover plate (not shown in the drawings) of the frame 11. Each ram driver 17 is held on the frame 11. The ram driver includes: ball screws (rotation/linear motion converters) 21 each having the screw 19 and the nut 20; first motors 22 each serving as a high-speed drive source; first power transmitters 23; second motors 24 each serving as a pressure drive source; second power transmitters 25; clutches 26; and drive rotation bodies 37 each arranged apart from the nut 20 in an axial direction of the screw 19 and rotatable about a rotation axis of the nut 20. In this example, the ball screws 21 are used as rotation/linear motion converters. However, this disclosure is not limited to this configuration and, for example, roller screws or the like may be used as the rotation/linear motion converters. As shown in FIG. 1, the press brake 10 includes a controller 15 that controls the ram drivers 17. The control unit 15 may, for example, be constituted of a central processing unit, a memory storage device or the like, and may perform overall control of the entire press brake 10 including the ram drivers 17. The controller 15 includes: a synchronous rotation controller 15*a* that matches a rotation speed of the nut 20 being rotated by the first motor 22 with a rotation speed of the drive rotation body 37 described later being rotated by the second motor 24; and a use/non-use selector 15*b* that selects between use and non-use of the clutch 26 described later.

Figure 3:
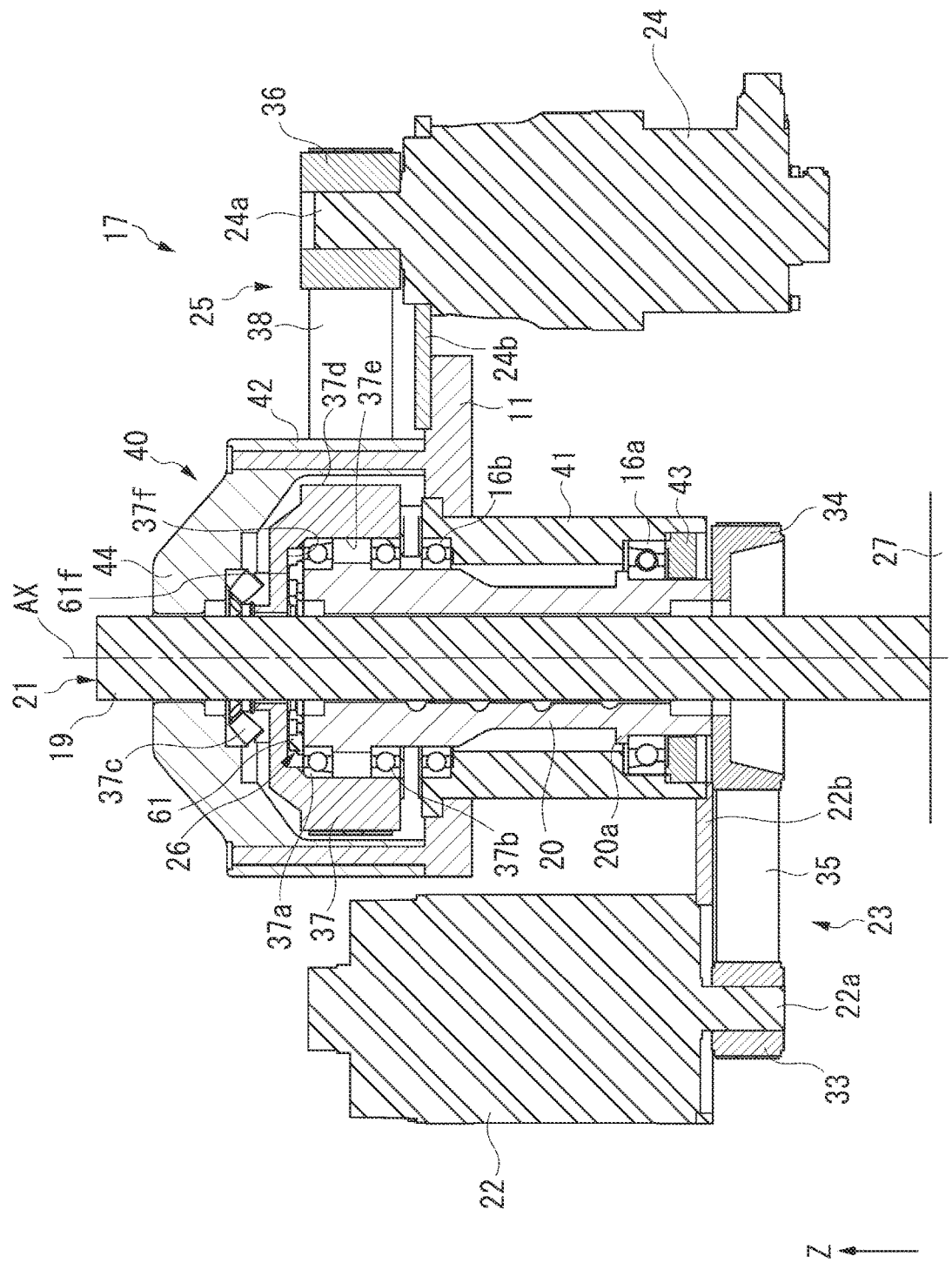
FIG. 3 is a diagram describing a ram driver of the press brake of the first example.

FIG. 3 is a diagram describing the ram driver 17 of the press brake 10. As shown in FIG. 3, the screw 19 is arranged along the vertical direction (the Z direction), and a lower end thereof is attached to the ram 27. The screw 19 is attached to the ram 27 so that rotation thereof is restricted. The screw 19 is movable integrally with the ram 27 in the vertical direction. The length of the screw 19 is set according to a movement range of the upper tool 29.

The nut 20 is arranged in a state of being screw-coupled with the screw 19. The nut 20 is accommodated in a case 40 fixed to the frame 11. Therefore, the vertical movement of the nut 20 is restricted. The case 40 has a first body 41, a second body 42, a first cover 43, and a second cover 44. The first body 41 is provided, for example, in a cylindrical shape and is arranged around a lower part of the nut 20. The first body 41 rotatably supports the nut 20 about an axis line AX by bearings 16*a*, 16*b*. As the bearings 16*a*, 16*b*, ball bearings or the like are used, for example. The bearing 16*a* is arranged at a lower end part of the first body 41. The bearing 16*b* is arranged at an upper end part of the first body 41. The bearing 16*a* is disposed below a flange 20*a* of the nut 20. The bearing 16*a* is arranged in a state of being sandwiched between the flange 20*a* and the first cover 43 described later. The bearing 16*a* and the first cover 43 restrict downward movement of the nut 20.

The second body 42 is arranged above the first body 41 and fixed to the first body 41 by a fixture such as a bolt. The second body 42 is provided in a cylindrical shape, for example, and has an inner diameter and an outer diameter greater than those of the first body 41. The second body 42 is arranged at a position surrounding the upper part of the nut 20 and the drive rotation body 37 described later.

The first cover 43 is arranged at the lower end part of the first body 41. The first cover 43 has an opening at the center thereof, and a lower end part of the nut 20 projects downward from the opening. Moreover, the screw 19 is arranged in the opening of the first cover 43 in the state of penetrating therethrough. The second cover 44 is arranged at an upper end part of the second body 42. The second cover 44 has an opening at the center thereof, and the screw 19 is arranged in the state of projecting upward from the opening.

For the first motor 22, for example, a servo motor of a low-torque and high-speed rotation type is used. An output axis 22a of the first motor 22 is coupled with an input side of the first power transmitter 23. The first motor 22 is arranged on the frame 11 in a fixed state by a fixture 22b. With this configuration, the movement of the first motor 22 in the vertical direction and the left-right direction is restricted with respect to the frame 11. The first motor 22 drives the output axis 22a to rotate according to an instruction from the controller 15.

As with the first motor 22, for the second motor 24, a servo motor is used, for example. A servo motor of a high-torque and low-speed rotation type is used as the second motor 24. An output axis 24a of the second motor 24 is coupled with an input side of the second power transmitter 25. The second motor 24 is arranged on the frame 11 in a fixed state by a fixture 24b. With this configuration, the movement of the second motor 24 in the vertical direction and the left-right direction is restricted with respect to the frame 11. As with the first motor 22, the second motor 24 drives the output axis 24a to rotate according to an instruction from the controller 15. As described above, in this example, the first motor 22 and the second motor 24 are supported on the frame 11 respectively so that the relative positions of the first motor 22 and the second motor 24 are maintained.

The first power transmitter 23 transmits rotation of the first motor 22 to the nut 20 at high speed and with low torque. The first power transmitter 23 includes an output axis pulley 33, a drive pulley 34, and a belt 35. The output axis pulley 33 is attached to the output axis 22a of the first motor 22. The drive pulley 34 is fixed, coaxially with the nut 20, at the lower end part of the nut 20. The belt 35 is arranged across the output axis pulley 33 and the drive pulley 34. Therefore, by driving the first motor 22, the nut 20 is rotated at high speed and with low torque via the first power transmitter 23. The rotation of the nut 20 causes the screw 19, rotation of which is restricted by the ram 27, to move at high speed in the vertical direction.

The second power transmitter 25 transmits rotation of the second motor 24 to the drive rotation body 37 at low speed and with high torque. The second power transmitter 25 includes an output axis pulley 36, the drive rotation body 37, and a belt 38. The output axis pulley 36 is attached to the output axis 24a of the second motor 24. The drive rotation body 37 is arranged above and apart from the nut 20 to be coaxial with the nut 20. The drive rotation body 37 is accommodated in the case 40 together with the nut 20. As with the nut 20, the drive rotation body 37 is supported on the case 40 to be rotatable about the axis line AX. Furthermore, the drive rotation body 37 is arranged on the inner side of the second body 42 and on the lower side of the second cover 44. The drive rotation body 37 can be coupled with the nut 20 by the clutch 26.

The drive rotation body 37 has an accommodating part 37e that accommodates an upper part (a part) of the nut 20. An inner circumferential part of the drive rotation body 37, which is a side face of the accommodating part 37e, is opposed to an outer circumferential face of the upper part of the nut 20 via bearings 37a, 37b. The drive rotation body 37 is the bearings 37a, 37b to be allowed by the bearings 37a, 37b to rotate about the rotation axis of the nut 20. The bearings 37a, 37b are arranged above the bearing 16b and may or may not support the upper part of the nut 20. A thrust bearing 37c is arranged on the upper part of the drive rotation body 37. The thrust bearing 37c is arranged between the drive rotation body 37 and the second cover 44 of the case 40.

Therefore, the drive rotation body 37 is rotatably supported in the axial direction thereof by the thrust bearing 37c held by the case 40 (the frame 11). Also, upward movement of the drive rotation body 37 is restricted by the thrust bearing 37c. With this configuration, upward movement of the screw 19 and the nut 20 is restricted. The thrust bearing 37c is a reaction force receiver that receives a reaction force acting on the drive rotation body 37 when performing bending work on a workpiece W. The second cover 44 receives the reaction force acting on the thrust bearing 37c, and is therefore formed with an increased thickness and an increased rigidity.

The belt 38 is arranged across the output axis pulley 36 and a power receiver 37d, which is an outer circumferential part of the drive rotation body 37. Therefore, by driving the second motor 24, the drive rotation body 37 is rotated at low speed and with high torque via the second power transmitter 25. When the drive rotation body 37 is coupled with the nut 20 by the clutch 26, the nut 20 is rotated at low speed and with high torque by the rotation of the drive rotation body 37, and thereby the screw 19 can be moved downward at low speed and with high load (high thrust).

Although the ram driver 17 is of a configuration in which the first power transmitter 23 and the second power transmitter 25 transmit driving force by the belts 35, 38, this disclosure is not limited to this configuration and, for example, driving force may be transmitted by a link mechanism or a gear train. Furthermore, the disclosure is not limited to such a configuration in which two of the ram drivers 17 are arranged for the single ram 27, and one or three or more ram drivers 17 may be arranged.

The clutch 26 couples the nut 20 being rotated by the first motor 22 with the drive rotation body 37, and transmits the rotation (driving force) of the drive rotation body 37 to the nut 20. An annular member 61 is fixed on an upper end face of the nut 20 by a fixing member such as a bolt. For example, the annular member 61 is arranged such that an end face 61f thereof is formed flat and opposed to a flat lower face 37f of the drive rotation body 37. However, the end face 61f of the annular member 61 and the lower face 37f of the drive rotation body 37 are not limited to being flat, and other shapes may be used therefor. The clutch 26 couples the nut 20 and the drive rotation body 37 by bringing the end face 61f of the annular member 61 into contact with the lower face 37f of the drive rotation body 37.

Figure 4:
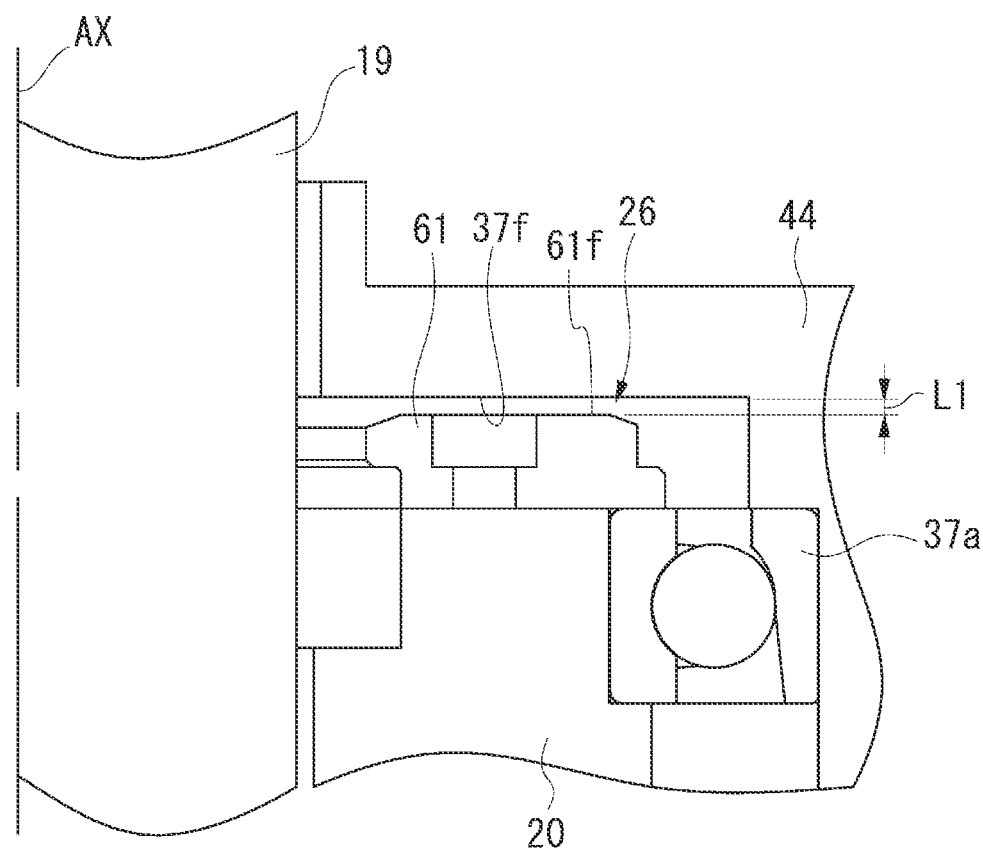
FIG. 4 is a diagram showing a moment when a clutch of the first example is disengaged.
Figure 5:
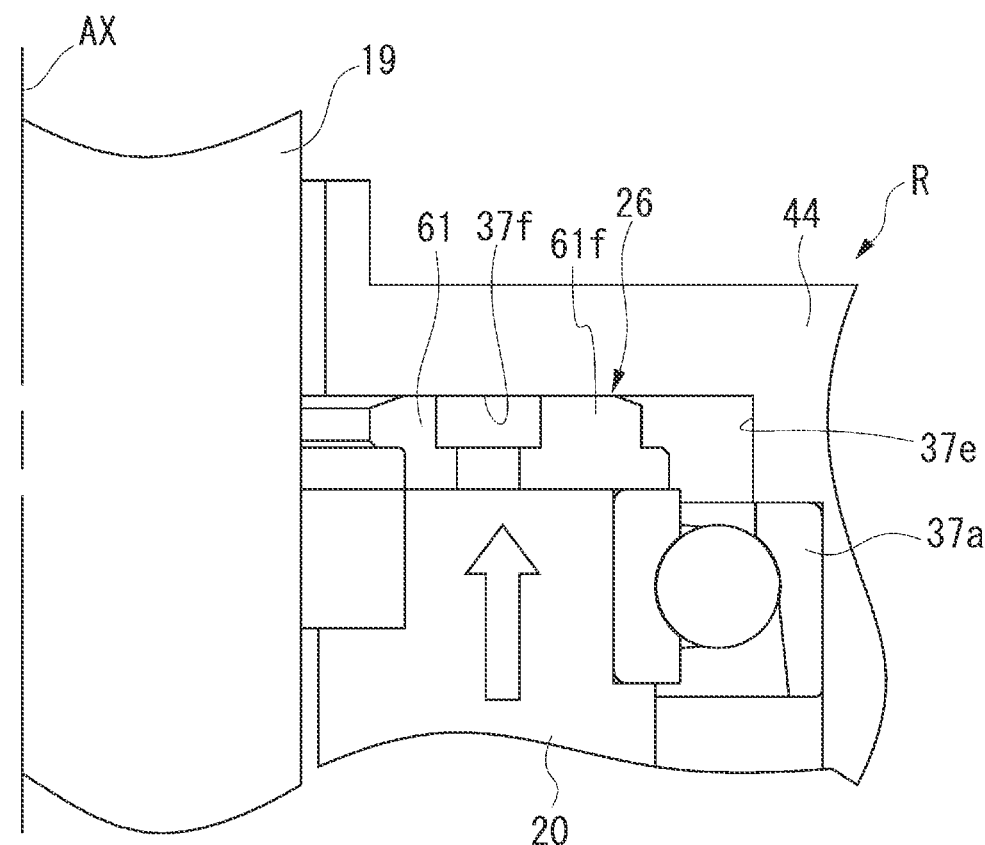
FIG. 5 is a diagram showing a moment when the clutch of the first example is engaged.

FIGS. 4 and 5 are diagrams showing a principal part of the ram driver 17, and show a positional relationship between the drive rotation body 37 and the nut 20, involving the clutch 26 therebetween. FIG. 4 shows a state where the upper tool 29 is receiving no reaction force from the workpiece W, and FIG. 5 shows a state where the upper tool 29 is receiving reaction force from the workpiece W. As shown in FIG. 4, when the upper tool 29 is receiving no reaction force from the workpiece W, a clearance L1 is maintained between the end face 61f of the annular member 61 and the lower face 37f of the drive rotation body 37. The clearance L1 is set to a value, for example, from several tens of μm to several mm. In such an example, even when the nut 20 is rotated by the driving force of the first motor 22, the rotation of the nut 20 is not transmitted to the drive rotation body 37. Also, even when the drive rotation body 37 is rotated by the driving force of the second motor 24, the rotation of the drive rotation body 37 is not transmitted to the nut 20.

As shown in FIG. 5, when the upper tool 29 receives a reaction force from the workpiece W, the reaction force pushes the nut 20 upward via the ram 27 and the screw 19. As a result of the nut 20 being pushed upward, in the bearing 37a, which is a ball bearing rotatably supporting the nut 20, an inner ring thereof moves upward with respect to an outer ring thereof, or a part or the entire bearing 37a deforms elastically. Although not shown in the drawings, the same applies to the bearings 37b, 16a, 16b that rotatably support the nut 20. As a result, the nut 20 and the annular member 61 integrally move upward, and the annular member 61 comes in contact with the drive rotation body 37 to push the drive rotation body 37 upward. That is to say, the nut 20 and the drive rotation body 37 are coupled by the clutch 26 and become integrated into a rotating body R. Therefore, by rotating the drive rotation body 37 by the second motor 24, rotation of the drive rotation body 37 is transmitted to the nut 20 via the annular member 61, and rotation (driving force) can be given to the nut 20. When the upper tool 29 is no longer receiving the reaction force from the workpiece W, the nut 20 moves downward via the ram 27 and the screw 19, and the annular member 61 separates from the drive rotation body 37, thereby disengaging the clutch 26. The ram driver 17 is thus capable of engaging and disengaging the clutch 26 without using a drive source dedicated to the clutch. In FIG. 5, the nut 20 is moved upward by the positional change between the inner ring and the outer ring of the bearing 37a or by the elastic deformation of the bearing 37a. However, the disclosure is not limited to this configuration. For example, the bearing 37a may be movable upward and downward with respect to the drive rotation body 37 so that the nut 20 moves upward and downward together with the bearing 37a, or the nut 20 may be movable upward and downward with respect to the bearing 37a so that the nut 20 moves upward and downward with respect to the bearing 37a.

Figure 6A:
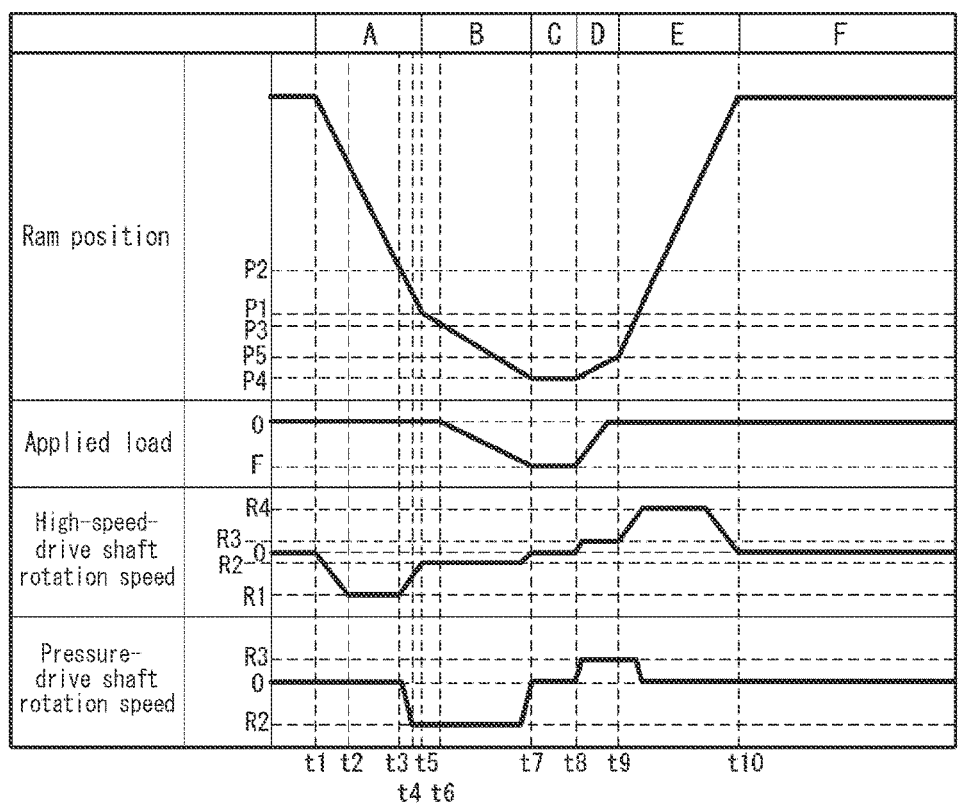
FIG. 6(A) is a timing chart of a method of performing press work according to the example.

Next, a method of performing press work by the press brake 10 will be described with reference to FIGS. 6(A) and 6(B). FIG. 6(A) is a timing chart of the method of performing press work according to this example. In FIG. 6(A), the position of the ram 27, the magnitude of load (thrust) applied to the workpiece W, the rotational direction and the rotation speed of the output axis 22a of the first motor 22, and the rotational direction and the rotation speed of the output axis 24a of the second motor 24 are shown in correspondence with each other. The horizontal axis of FIG. 6(A) represents time. The operations of the first motor 22 and the second motor 24 of the ram driver 17 described below are executed by the controller 15 described above (see FIG. 1). First, the workpiece W is positioned on the lower tool 12 in the state where the upper tool 29 is raised upward. The press brake 10 has a work positioner not shown in the drawings, and the operator positions the workpiece W on the lower tool 12 by abutting the distal end of the workpiece W against the work positioner.

After having completed positioning of the workpiece W, the ram 27 (the upper tool 29) is lowered to a first position P1 at which the ram 27 comes into the close vicinity of the workpiece (section A: high-speed descent). The section A is a section in which the upper tool 29 approaches the workpiece W. In the high-speed descending operation, the nut 20 is rotated at high speed by the first motor 22. An operation of each part in the descending operation of the ram 27 will be specifically described. After driving by the first motor 22 is started (at time t1), the rotation speed per unit time (for example, rpm, hereinafter simply referred to as "rotation speed") of the first motor 22 is gradually increased from time t1. When the rotation speed of the first motor 22 reaches a predetermined first rotation speed R1 (at time t2), the rotation speed is made constant at the first rotation speed R1. At this time, a clearance L1 is present between the drive rotation body 37 of the second power transmitter 25 and the annular member 61 (see FIG. 4). Accordingly, the nut 20 is being rotated at high speed by the driving force of the first motor 22, and rotation of the nut 20 is not transmitted to the drive rotation body 37. Therefore, the high-speed rotation of the nut 20 causes the screw 19 to descend at high speed.

Thereafter, the rotation speed of the first motor 22 is gradually decreased from the first rotation speed R1 at a second position P2 while the ram 27 is still on its way to the first position P1 (at time t3). Thus, the rotation speed is decreased at a point in time when the ram 27 reaches the first position P1 (at time t5) so that the rotation speed of the first motor 22 becomes the second rotation speed R2 that is lower than the first rotation speed R1. That is to say, the controller 15 controls the first motor 22 so that the rotation speed of the nut 20 is reduced to the second rotation speed R2 (rotation speed) of the drive rotation body 37 being rotated or scheduled to be rotated at low speed by the second motor 24. The second rotation speed R2 is, for example, a rotation speed at the time of performing the bending work on the workpiece W. By reducing the rotation speed of the first motor 22, rotation of the nut 20 is gradually reduced, and the screw 19 descends while the descending speed is gradually reduced.

On the other hand, when the ram 27 reaches the second position P2 (at time t3), driving of the second motor 24 is started, and the drive rotation body 37 is rotated. Thus, the rotation speed of the second motor 24 is gradually increased so that the rotation speed of the drive rotation body 37 reaches the above second rotation speed R2 at a point in time, for example, when the ram 27 reaches the first position P1 (at time t4). That is to say, the synchronous rotation controller 15a of the controller 15 matches the rotation speed of the nut 20 being rotated by the first motor 22 with the rotation speed of the drive rotation body 37 described later being rotated by the second motor 24. The timing chart of FIG. 6(A) is an example of when time t4 is before time t5, that is, when the rotation speed of the second motor 24 reaches the second rotation speed R2 before the first motor 22 does. However, the disclosure is not limited to this example, and at a point in time when the ram 27 reaches the first position P1 (at time t5), the rotation speed of the second motor 24 may reach the second rotation speed R2 at the same time as the first motor 22.

Through the operation described above, when the ram 27 reaches the first position P1 (at time t5), the rotation speed of the nut 20 by the first motor 22 and the rotation speed of the drive rotation body 37 by the second motor 24 both reach the second rotation speed R2. That is to say, the nut 20 and the drive rotation body 37 now rotate synchronously. As a result, the rotation speed of the nut 20 (the annular member 61) and the rotation speed of the drive rotation body 37 become the same speed. At this stage, the clearance L1 is still present between the annular member 61 and the drive rotation body 37, and the annular member 61 and the drive rotation body 37 are rotating at the same rotation speed while being apart from and opposed to each other.

After the ram 27 has reached the first position P1, the ram 27 is lowered at low speed (section B: low-speed pressurization). In the low-speed pressurizing operation, first, the ram 27 is lowered at low speed from the first position P1 to a third position P3 by the driving of the first motor 22. The third position P3 is a position of the ram 27 at the time when the upper tool 29 comes in contact with the workpiece W.

When the ram 27 reaches the third position P3 (at time t6), the upper tool 29 contacts the workpiece W and receives a reaction force from the workpiece W. This reaction force pushes the nut 20 and the annular member 61 upward, and the annular member 61 (the nut 20) and the drive rotation body 37 are coupled (see FIG. 5). At this time, since the rotation speeds of the nut 20 and the drive rotation body 37 are matched at the second rotation speed R2, the annular member 61 and the drive rotation body 37 are coupled smoothly in a short length of time without stopping the rotation of the nut 20 and the drive rotation body 37. The reaction force acting on the nut 20 is received by the thrust bearing 37c and, therefore, a reduction in the pressurizing force acting on the workpiece W is suppressed.

As a result of the annular member 61 and the drive rotation body 37 having been coupled, the nut 20 rotates in a state where the driving force of the first motor 22 and the driving force of the second motor 24 are applied thereto. Rotation of the nut 20 causes the screw 19 to descend and the ram 27 moves to a fourth position P4. The fourth position P4 is a position of the ram 27 at a point in time when the upper tool 29 reaches a bottom dead center (at time t7). When the ram 27 reaches the fourth position P4, the upper tool 29 reaches the bottom dead center, and the workpiece W is sandwiched between the upper tool 29 and the lower tool 12 to perform the bending work on the workpiece W. That is to say, the controller 15 controls the first motor 22 so that the upper tool 29 descends within a range that includes at least a part of a stroke of approaching the workpiece W among strokes including the stroke of approaching the workpiece W, a stroke of contacting the workpiece W, and a stroke of ending the bending work. Also, having matched the rotation speed of the nut 20 being rotated by the first motor 22 with the rotation speed of the drive rotation body 37 being rotated by the second motor 24 during the approaching stroke by the synchronous rotation controller 15a, the controller 15 causes the nut 20 and the drive rotation body 37 to couple with each other by the clutch 26. While the ram 27 is lowered from the third position P3 to the fourth position P4, the load (thrust) required to perform work on the workpiece W is distributed to the first motor 22 and the second motor 24 respectively. Therefore, it is possible to reduce the output and size of the second motor 24.

Further, the rotation speeds of the first motor 22 and the second motor 24 are decreased from a moment immediately before time t7 (immediately before the upper tool 29 reaches the bottom dead center), the driving of the first motor 22 and the second motor 24 is stopped at time t7, and the driving of the first motor 22 and the second motor 24 is stopped until time t8 (section C: stop). By stopping the driving of the first motor 22 and the second motor 24, the upper tool 29 is maintained at the bottom dead center so that the workpiece W is not pressurized beyond the bottom dead center. At time t8, the first motor 22 and the second motor 24 are synchronized and driving thereof in reverse rotation is started. The rotation speeds of the reverse rotation of the first motor 22 and the second motor 24 are gradually increased in synchronization, and maintained at the third rotation speed R3 at the same timing (section D: pressure release). In section D, the ram 27 moves from fourth position P4 to fifth position P5. As a result, the load applied to the workpiece W gradually decreases from time t8, and the load becomes 0 immediately before time t9. Thereby, the pressure on the workpiece W is released.

By moving the screw 19 upward in this section D, the upper tool 29 is separated from the workpiece W. Since the reaction force from the workpiece W acting on the upper tool 29 is removed by separating the upper tool 29 from the workpiece W, the upward pressing force on the nut 20 and the annular member 61 is removed. As a result, the load of the ram 27 causes the nut 20 and the annular member 61 to move downward with respect to the drive rotation body 37. Therefore, the annular member 61 separates downward from the drive rotation body 37, and the clearance L1 is present between the annular member 61 and the drive rotation body 37 (at time t9). At this time, the driving force from the second motor 24 is cut off and the nut 20 is now rotated by the driving force of the first motor 22.

Thereafter, the rotation speed of the first motor 22 is gradually increased from the third rotation speed R3 to the fourth rotation speed R4 (section E: high-speed ascent). At this time, the nut 20 is rotated at high speed by the high-speed rotation of the first motor 22. The high-speed rotation of the nut 20 causes the screw 19 to ascend at high speed. The ascent of the screw 19 causes the ram 27 to return to the original position thereof (at time t10). After the ram 27 has returned to the original position, the first motor 22 is stopped. On the other hand, after the annular member 61 has separated downward from the drive rotation body 37 (after time t9), the second motor 24 continues to drive at the third rotation speed R3 for a predetermined length of time and then stops the driving thereof. When the ram 27 has returned to the original position and the operation of the first motor 22 has been stopped, the operation of the press brake 10 is completed (section F: operation stop).

Figure 6B:
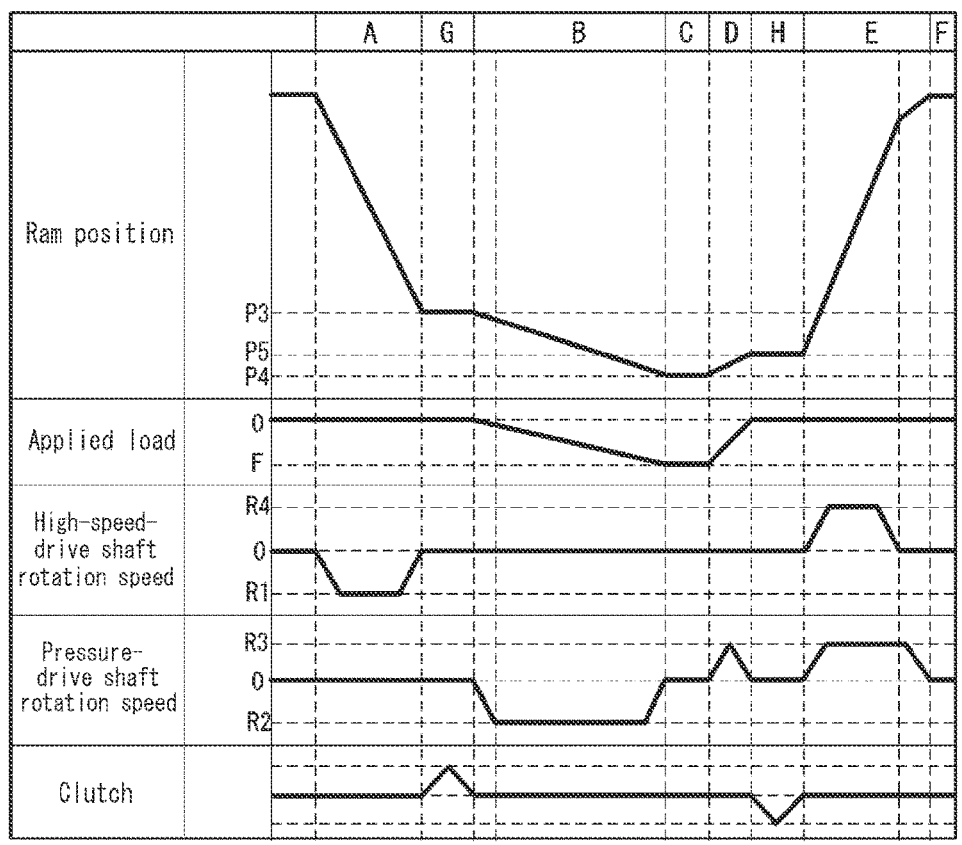
FIG. 6(B) is a timing chart of a conventional method of performing press work.

FIG. 6(B) is a timing chart showing the operation of a conventional press brake. The conventional press brake uses a first motor when lowering the ram at high speed (section A), and uses a second motor when performing work on the workpiece by low-speed pressurization of the ram (section B). In such a configuration, it is necessary to stop both the first motor and the second motor and then operate the clutch when switching the drive source and, therefore, a length of time is required for this operation (sections G, H), and the length of time required to perform work on the workpiece is increased. Also, since only the second motor is used to perform work on a workpiece, it is necessary to use a large-scale (high-power) second motor that leads to an increase in cost. Compared to the conventional configuration, in the method of performing press work according to this example, it is not necessary to stop both the first motor and the second motor when switching the drive source and, furthermore, the driving force of both the first motor of the second motor is used when performing work on the workpiece W. With such a configuration, it is possible to reduce the length of time required to perform work on the workpiece W and miniaturize the second motor 24.

According to the press brake 10 and the method of performing press work of the first example, when one or both of the first motor 22 and the second motor 24 are driven, the relative position therebetween is maintained. Therefore, there is no need for a guiding mechanism that guides one of the first motor 22 and the second motor 24. With such a configuration, it is possible to suppress the entire configuration from becoming complex and thereby suppress an increase in cost. Furthermore, since the nut 20 is driven by the first motor 22 and the second motor 24, it is possible to smoothly switch the drive source. In the method of performing press work described above, the bending work is performed on the workpiece W by rotating the nut 20 by both the first motor 22 and the second motor 24. However, this disclosure is not limited to this configuration. The controller 15 may cause the nut 20 to rotate by the first motor 22 only to execute the bending work on the workpiece W. Thus, the controller 15 selects non-use of the clutch 26 (that is, non-use of the second motor 24) by the use/non-use selector 15b (see FIG. 1). For example, when the reaction force is small when performing bending work on the workpiece W (that is, low-load bending work where the bending work is performed on the workpiece W with a low load), movement of the inner ring of the bearing 37a or deformation of the bearing 37a is small, and the clutch 26 does not couple the nut 20 and the drive rotation body 37. Therefore, the bending work on the workpiece W is performed with the rotation of the nut 20 by only the first motor 22. On the other hand, when the reaction force is large when performing the bending work on the workpiece W, the controller 15 selects use of the clutch 26 (that is, use of the second motor 24) by the use/non-use selector 15b, and the nut 20 and the drive rotation body 37 are coupled by the clutch 26 as described above.

SECOND EXAMPLE

Figure 7:
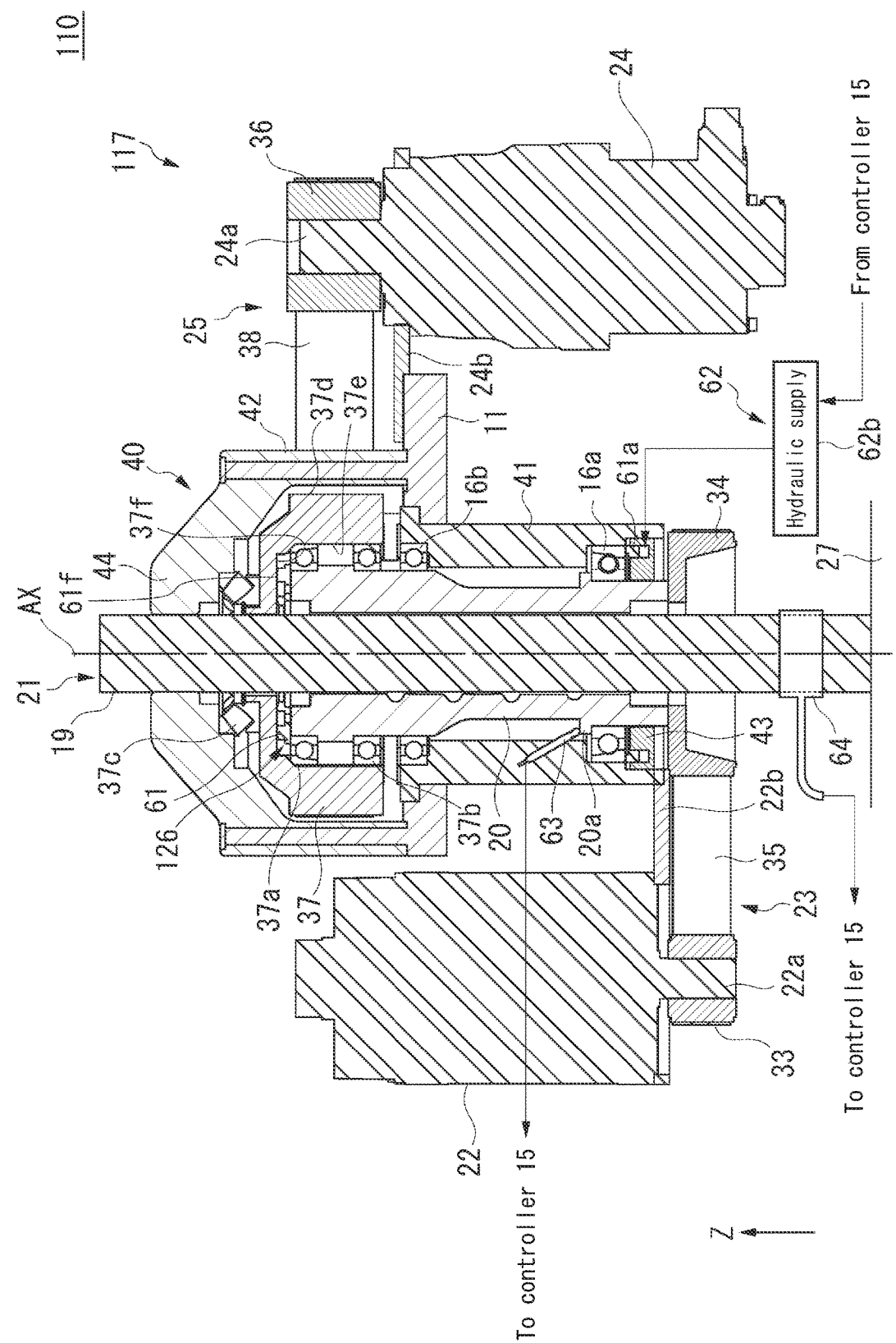
FIG. 7 is a diagram describing a ram driver of a press brake of a second example.

Hereunder, a second example is described with reference to FIG. 7. FIG. 7 is a diagram describing a ram driver of a press brake of a second example. In FIG. 7, a ram driver 117 of a press brake 110 is shown, and the configuration other than the ram driver 117 is the same as that of the first example shown in FIGS. 1 to 5. In this example, the same configurations as those in the first example are assigned with the same symbols and the descriptions thereof are omitted or simplified.

As shown in FIG. 7, in the ram driver 117, a clutch 126 has a driver 62. The driver 62 causes the nuts 20 and the drive rotation body 37 being rotated to come in contact with each other by the first motor 22. In the second example, the driver 62 has a hydraulic cylinder that raises and lowers the nut 20. Specifically, the driver 62 has a piston 62a and a hydraulic supply 62b that supplies oil to a cylinder chamber in which the piston 62a slides upward and downward. The driving of the driver 62 is controlled by the controller 15 (see FIG. 1).

The hydraulic cylinder is formed in the first cover 43 of the case 40, and the piston 62a is arranged below and adjacent to the bearing 16a that supports the lower part of the nut 20. The piston 62a is arranged at a position where the flange 20a and the piston 62a sandwich the bearing 16a in the vertical direction. The hydraulic pressure of the cylinder chamber is adjusted by the hydraulic supply 62b, and thereby the piston 62a moves in the vertical direction. The piston 62a can move upward and push the nut 20 upward as the oil from the hydraulic supply 62b is supplied into the cylinder chamber. On the other hand, the piston 62a moves downward when the oil supply from the hydraulic supply 62b is stopped or the oil supply pressure decreases while the piston 62a is in the state of being positioned on the upper side.

Therefore, the driver 62 can bring the end face 61f of the annular member 61 into contact with the lower face 37f of the drive rotation body 37 by pushing the nut 20 upward by the piston 62a of the hydraulic cylinder. The driver 62 can separate the end face 61f of the annular member 61 from the lower face 37f of the drive rotation body 37 by moving the piston 62a downward from the state where the end face 61f of the annular member 61 contacts the lower face 37f of the drive rotation body 37. In this manner, at arbitrary timing, the driver 62 can perform, by the controller 15, switching between bringing the annular member 61 and the drive rotation body 37 into contact with each other and separating them from each other, that is, switching between coupling them and disengaging them by the clutch 126. The driving of the driver 62 may be performed by the use/non-use selector 15b of the controller 15 (see FIG. 1). For example, when the use/non-use selector 15b selects non-use of the clutch 126, it is not necessary to drive the driver 62, and when the use/non-use selector 15b selects use of the clutch 126, the driver 62 may be driven as described above.

Moreover, the ram driver 117 has a sensor 63. The sensor 63 is arranged on the upper face of the flange 20a. As the sensor 63, various types of sensors including a contact type sensor such as a pressure sensor, or a non-contact type sensor such as an optical sensor may be used. When the nut 20 is pushed upward, the sensor 63 can detect the upward pressure applied to the flange 20a or the upward movement of the flange 20a. The detection result is sent to the controller 15, for example. When the upward pressure applied to the nut 20 is released or when the flange 20a moves downward, the sensor 63 can detect the pressure release and the downward movement. Thus, for example, an event of the nut 20 having been pushed upward by the driver 62 or an event of the nut 20 having been returned downward by the driver 62 is sent to the controller 15 by detecting the pressure or the movement of the flange 20a, for example, and thereby the sensor 63 can detect coupling or disengaging of the clutch 126. The sensor 63 can be installed irrespective of the presence or absence of the driver 62, and can also be applied to other configurations in which the nut 20 moves upward and downward.

Moreover, the ram driver 117 has a sensor 64 separate from the sensor 63. The sensor 64 is arranged, for example, at the lower part of the screw 19. As the sensor 64, for example, a load cell, a temperature sensor, or the like is used. When the sensor 64 is a load cell, a load (thrust) or a torque acting on the screw 19 can be detected. When the sensor 64 is a temperature sensor, the temperature of the ram driver 17 or the ram 27 can be detected. The arrangement of one or both of the sensors 63, 64 is arbitrary and one or both of the sensors 63, 64 need not be provided.

In the press brake 110, the operation is stopped after performing the high-speed descending operation, the low-speed pressurizing operation, the stopping operation, the pressure release operation, and the high-speed ascending operation by the same method as that of the first example. When (at time t5 shown in FIG. 6(A), for example) or after the rotation speed of the first motor 22 and the rotation speed of the second motor 24 become the same second rotation speed R2, the driver 62 drives the piston 62a by supplying thereto oil from the hydraulic supply 62b to thereby couple the annular member 61 with the drive rotation body 37. At this time, the sensor 63 may detect an event of the nut 20 being pushed upward. It is possible, with the sensor 63, to easily confirm the event of the annular member 61 (the nut 20) having been coupled with the drive rotation body 37.

In the driver 62, during the pressure release operation (see the section D of FIG. 6(A)), the piston 62a is lowered together with the nut 20 by the load of the ram 27 by stopping the supply of oil from the hydraulic supply 62b or reducing the oil supply pressure after the upper tool 29 has separated from the workpiece W. As a result of the piston 62a having been lowered, the annular member 61 is separated from the drive rotation body 37. At this time, the sensor 63 may detect an event of the nut 20 being returned downward. The sensor 63 allows the controller 15 to easily confirm the event of the coupling between the annular member 61 and the drive rotation body 37 having been disengaged. When the sensor 64 is a load cell, a load or a torque value applied to the screw 19 is detected, and when the load or the torque value becomes equal to or greater than a preliminarily set value, a notification may be issued by an alarm or the like to indicate that the load (thrust) or the torque (rotational moment) acting on the ram 27 is high. When the sensor 64 is a temperature sensor, the temperature of the ram driver 17 or the ram 27 is detected and if the detected temperature is equal to or greater than a preliminarily set value, a notification may be issued by an alarm or the like to indicate that the temperature is high.

As described above, in the press brake 110 according to the second example, as with the first example, the relative positions of the first motor 22 and the second motor 24 are maintained. Therefore, there is no need for a guiding mechanism to guide one of the first motor 22 and the second motor 24, and an increase in cost can be suppressed. Furthermore, it is possible to reduce the length of time required to perform work on the workpiece W and miniaturize the second motor 24.

In the press brake 110, since the clutch 126 includes the driver 62 to bring the nut 20 rotated by the first motor 22 and the drive rotation body 37 into contact with each other, the driver 62 can reliably perform coupling and disengaging by the clutch 126, and the timing of coupling can be arbitrarily set. Also, since the press brake 110 includes the sensor 63 to detect the contact between the nut 20 and the drive rotation body 37 established by the driver 62, it is possible, by the sensor 63, to reliably detect the state of the coupling having been established or the state of the disengaging having been performed. The above driver 62 uses the hydraulic cylinder, however, this disclosure is not limited to this configuration. For example, a pneumatic cylinder may be used, or an electric actuator such as a piezo element may be used.

THIRD EXAMPLE

Figure 8:
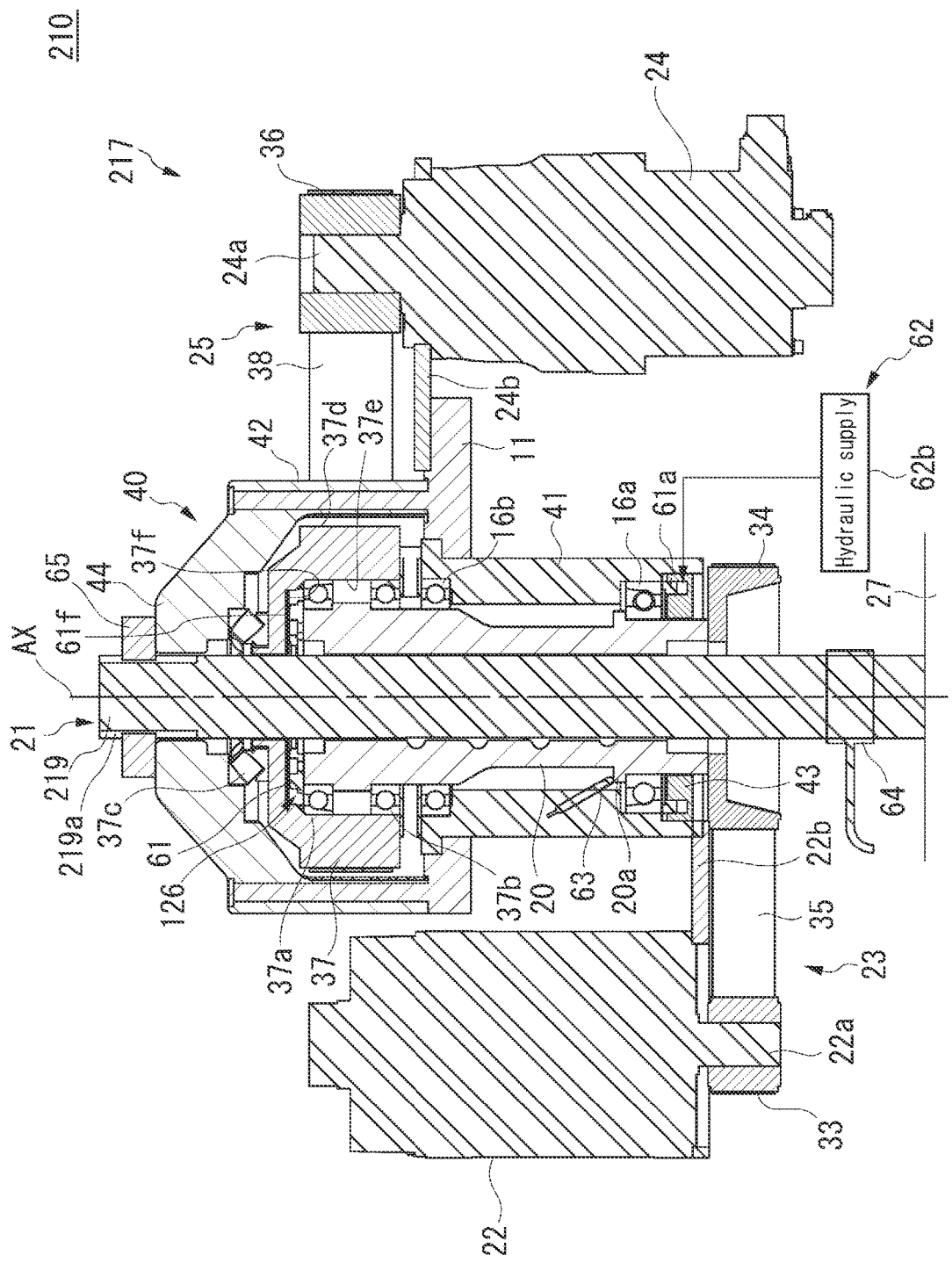
FIG. 8 is a diagram describing a ram driver of a press brake of a third example.

Hereinafter, a third example is described with reference to FIG. 8. FIG. 8 is a diagram describing a ram driver of a press brake of the third example. In FIG. 8, a ram driver 217 of a press brake 210 is shown, and the configuration other than the ram driver 217 is the same as that of the second example shown in FIG. 7. In this example, the same configurations as those in the first and second examples are assigned with the same symbols and the descriptions thereof are omitted or simplified.

As shown in FIG. 8, the ram driver 217 has splines 219a provided on a screw 219 as a rotation preventer to stop rotation of the screw 219, and a spline nut 65 through which the splines 219a penetrate. The splines 219a are provided at an upper part of the screw 219 including a portion projecting from the second cover 44 of the case 40. The splines 219a are formed downward from an upper end part of the screw 219. The vertical length of the splines 219a is set beyond a stroke range of the ram 27 (the upper tool 29), for example.

Figure 9:
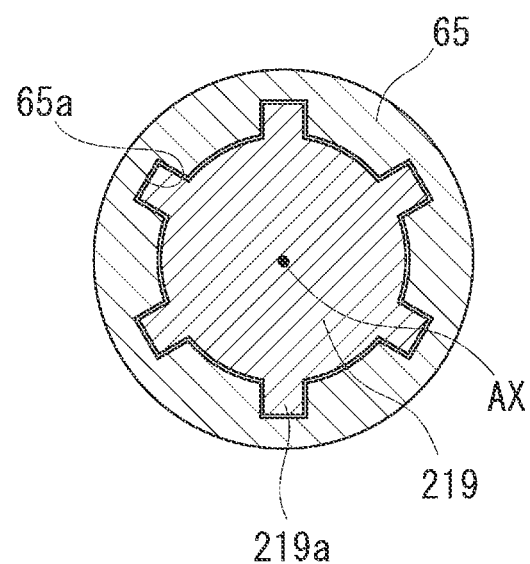
FIG. 9 is a diagram showing a configuration of a screw of the third example as viewed from above.

The spline nut 65 is provided on the second cover 44 of the case 40. The spline nut 65 is fixed to the second cover 44 by a fixing member such as a bolt (not shown in the drawings). Therefore, the spline nut 65 does not rotate with respect to the case 40 (the frame 11). The splines 219a of the screw 219 penetrate through the spline nut 65. FIG. 9 is a diagram showing a configuration of the screw 219 as viewed from above. As shown in FIG. 9, the spline nut 65 has a plurality of spline grooves 65a on an inner circumference thereof. The splines 219a of the screw 219 are inserted into the spline grooves 65a. With this configuration, at the upper part of the screw 219, the splines 219a are locked on the spline grooves 65a in the rotation direction about the axis line AX. For this reason, rotation of the screw 219 about the axis line AX is restricted. The splines 219a are movable in the vertical direction with respect to the spline nut 65. Therefore, the vertical movement of the screw 219 is not inhibited by the spline nut 65.

A method of performing press work on the workpiece W by the press brake 210 is the same as that in the second example. Even when a force is applied in the rotational direction of the screw 219, the ram driver 217 can receive the rotational direction force of the screw 219 by the spline nut 65. For example, when both of the first motor 22 and the second motor 24 are driven, a force acts to cause the screw 219 to co-rotate. However, it is possible to receive a part of this force by the spline nut 65, and reduce the rotation torque to be given to the ram 27.

As described above, in the press brake 210 according to the third example, as with the second example, the relative positions of the first motor 22 and the second motor 24 are maintained. Therefore, there is no need for a guiding mechanism to guide one of the first motor 22 and the second motor 24, and an increase in cost can be suppressed. Furthermore, it is possible to reduce the length of time required to perform work on the workpiece W and miniaturize the second motor 24. The driver 62 can reliably perform coupling and disengaging by the clutch 126, and the timing of coupling can be arbitrarily set. Also, it is possible, by the sensor 63, to reliably detect the state of the coupling having been established by the clutch 126 or the state of the disengaging having been performed. The splines 219a and the spline nut 65 shown in FIGS. 8 and 9 are an example of the rotation preventer, and any configuration capable of stopping the rotation of the screw 19 can be used. The rotation preventer including the splines 219a and the spline nut 65 can be applied to other examples in which the screw 19 does not rotate.

Since the press brake 210 has the rotation preventer including the splines 219a and the spline nut 65, rotation of the screw 219 is restricted. With this configuration, a part of the rotational torque of the screw 219 is received by the rotation preventer so that the rotational torque transmitted from the screw 219 to the ram 27 can be reduced and deformation of the ram 27 caused by the screw 219 can be prevented.

FOURTH EXAMPLE

Figure 10:
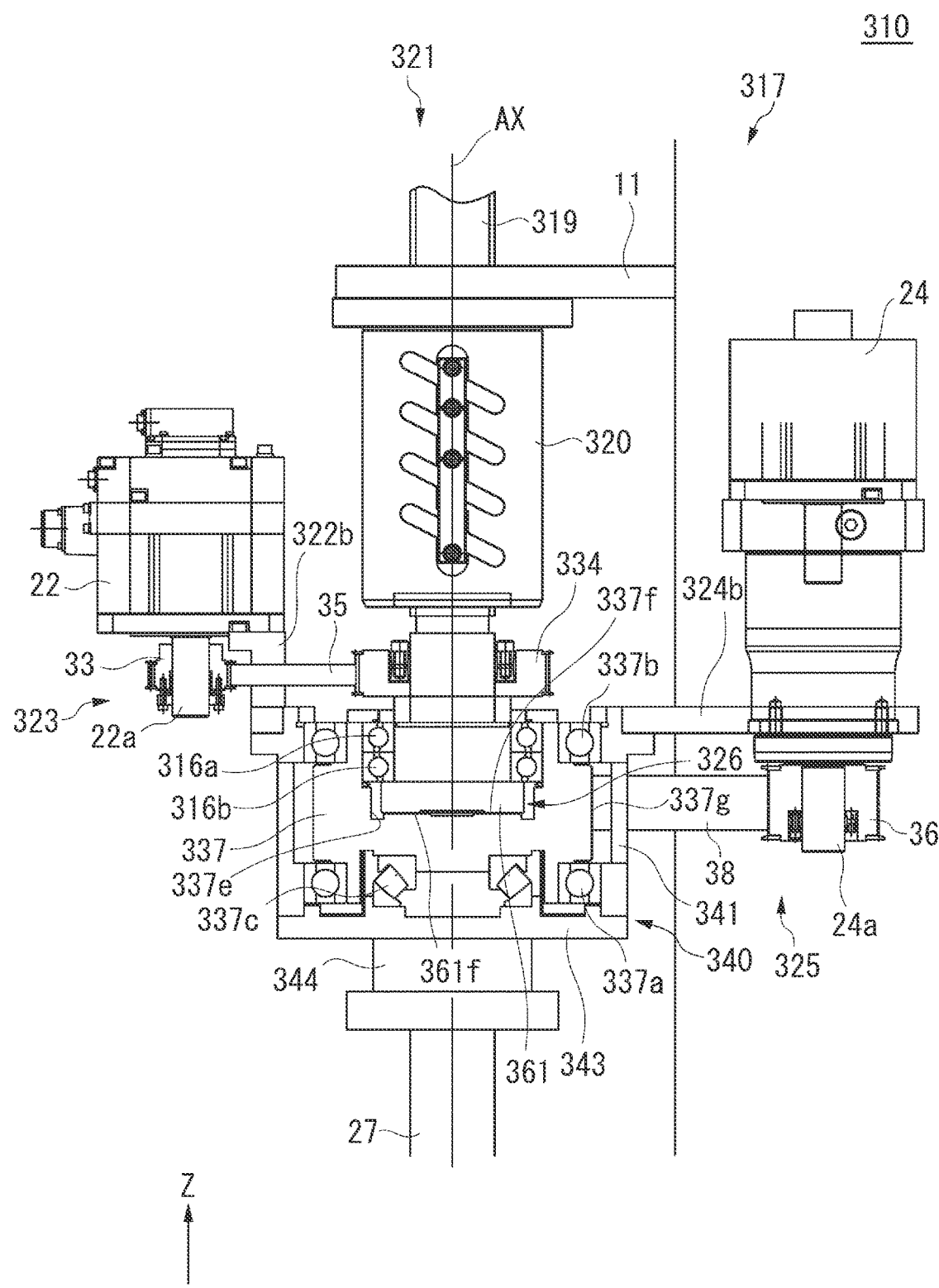
FIG. 10 is a diagram describing a ram driver of a press brake of a fourth example.

Hereinafter, a fourth example is described with reference to FIG. 10. FIG. 10 is a diagram describing a ram driver of a press brake of the fourth example. In FIG. 10, a ram driver 317 of a press brake 310 is shown, and the configuration other than the ram driver 317 is the same as that of the first example shown in FIGS. 1 to 5. In this example, the same configurations as those in the first example are assigned with the same symbols and the descriptions thereof are omitted or simplified. In this example, there is described a configuration in which rotation and vertical movement of a nut 320 are restricted, and the screw 319 is rotated and moved in the vertical direction.

As shown in FIG. 10, the ram driver 317 includes: a ball screw (rotation/linear motion converter) 321 having the screw 319 and a nut 320; a first motor 22; a first power transmitter 323; a second motor 24; a second power transmitter 325; a clutch 326; and a drive rotation body 337 arranged apart from the screw 319 in an axial direction of the screw 319 and rotatable about a rotation axis of the screw 319. The ball screw 321 is used as a rotation/linear motion converter. However, this disclosure is not limited to this configuration and, for example, a roller screw or the like may be used as the rotation/linear motion converter. The screw 319 is arranged along the vertical direction. A ram 27 is attached to the lower side of the screw 319 via a case 340. The screw 319 is movable integrally with the ram 27 in the vertical direction, and supported in a state of being suspended from the nut 320 fixed to the frame 11. A length of the screw 319 is set according to a stroke of the upper tool 29.

A lower part of the screw 319 is accommodated in the case 340 fixed to the ram 27. The case 340 has a body 341, and a cover 343. The body 341 is provided in a cylindrical shape and arranged around a lower part of the screw 319. The body 341 rotatably supports the drive rotation body 337 described later, about the axis line AX by bearings 337a, 337b. As the bearings 337a, 337b, ball bearings or the like are used, for example. The cover 343 is arranged at a lower end part of the body 341. The cover 343 is provided with a coupling member 344 to be coupled with the ram 27. Therefore, while the case 340 moves in the vertical direction together with the ram 27, the rotation thereof is restricted.

The nut 320 is arranged in a state of being screw-coupled with the screw 319. The nut 320 is fixed to the frame 11 by a fixing member such as a bolt (not shown in the drawings). Rotation and vertical movement of the nut 320 are restricted. The ram 27 is suspended from the nut 320 via the coupling member 344, the bearings 337a, 337b, the drive rotation body 337, the bearings 316a, 316b described later, and the screw 319.

The output axis 22a of the first motor 22 is coupled with the input side of the first power transmitter 323. The first motor 22 is fixed to the ram 27 via a fixture 322b and the case 340. The output axis 24a of the second motor 24 is coupled with the input side of the second power transmitter 325. The second motor 24 is fixed to the ram 27 via a fixture 324b and the case 340. As described above, in this example, the first motor 22 and the second motor 24 are supported on the frame 27 respectively, and the relative positions of the first motor 22 and the second motor 24 are maintained while they move together with the ram 27 in the vertical direction. Further, since the first motor 22 and the second motor 24 are fixed to the ram 27, there is no need for a guide to guide the movement in the vertical direction. However, there may be provided a guide to guide one or both of the first motor 22 and the second motor 24.

The first power transmitter 323 transmits rotation of the first motor 22 to the screw 319 at high speed and with low torque. The first power transmitter 323 includes the output axis pulley 33, a drive pulley 334, and the belt 35. The drive pulley 334 is fixed below the nut 320 and above the lower end part of the screw 319. The belt 35 is arranged across the output axis pulley 33 and the drive pulley 334. Therefore, by driving the first motor 22, the screw 319 is rotated at high speed and with low torque via the first power transmitter 323. The rotation of the screw 319 causes the screw 319 to move at high speed in the vertical direction.

The second power transmitter 325 transmits rotation of the second motor 24 to the drive rotation body 337 at low speed and with high torque. The second power transmitter 325 includes the output axis pulley 36, the drive rotation body 337, and the belt 38. The drive rotation body 337 is a drive pulley and arranged below and apart from the screw 319 to be coaxial with the screw 319. The drive rotation body 337 is accommodated in the case 340 together with the lower end part of the screw 319. The body 337 is rotatably supported on the case 340 to be rotatable about the axis line AX by the bearings 337a, 337b. The drive rotation body 337 can be coupled with the screw 319 by the clutch 326.

The drive rotation body 337 has an accommodating part 337e that accommodates a lower part (a part) of the screw 319. An inner circumferential part of the drive rotation body 337, which is a side face of the accommodating part 337e, is opposed to an outer circumferential face of the lower part of the screw 319 via bearings 316a, 316b. The drive rotation body 337 is arranged to be allowed by the bearings 337a, 337b to rotate about the rotation axis of the screw 319. The bearings 316a, 316b are arranged inside the drive rotation body 337 and may or may not support the lower part of the screw 319. At a lower part of the drive rotation body 337 there is arranged a thrust bearing 337c. The thrust bearing 337c is sandwiched and held between the drive rotation body 337 and the cover 343 of the case 340. The thrust bearing 337c supports the lower end of the drive rotation body 337, and appropriately transmits to the drive rotation body 337 a reaction force that acts via the ram 27 when performing work on the workpiece W. It is possible, with this configuration, to accurately move the drive rotation body 337 upward and reliably perform coupling by the clutch 326 described later.

The belt 38 is arranged across the output axis pulley 36 and a power receiver 337g, which is an outer circumferential part of the drive rotation body 337. Therefore, by driving the second motor 24, the drive rotation body 337 is rotated at low speed and with high torque via the second power transmitter 325. When the drive rotation body 337 is coupled with the screw 319 by the clutch 326, the screw 319 is rotated at low speed and with high torque by the rotation of the drive rotation body 337, and thereby the screw 319 can be moved downward at low speed and with high load (high thrust). Although the ram driver 317 is of a configuration in which the first power transmitter 323 and the second power transmitter 325 transmit driving force by the belts 35, 38, this disclosure is not limited to this configuration and, for example, driving force may be transmitted by a link mechanism or a gear train.

The clutch 326 couples the screw 319 being rotated by the first motor 22 with the drive rotation body 337, and transmits the rotation (driving force) of the drive rotation body 337 to the screw 319. A disc-shaped member 361 is fixed on a lower end face of the screw 319 by a fixing member such as a bolt. The disc-shaped member 361 is arranged such that an end face 361f thereof is formed flat and opposed to a flat end face 337f of the drive rotation body 337. However, the end face 361f of the disc-shaped member 361 and the end face 337f of the drive rotation body 337 are not limited to being flat, and other shapes may be used therefor. The clutch 326 couples the screw 319 and the drive rotation body 337 by bringing the end face 361f of the disc-shaped member 361 into contact with the end face 337f of the drive rotation body 337.

When the upper tool 29 does not receive reaction force from the workpiece W, a predetermined clearance (for example, a clearance L1 shown in FIG. 4) is present between the end face 361f of the disc-shaped member 361 and the end face 337f of the drive rotation body 337. When the upper tool 29 receives a reaction force from the workpiece W, the end face 337f of the drive rotation body 337 and the end face 361f of the disc-shaped member 361 contact each other.

Figure 11:
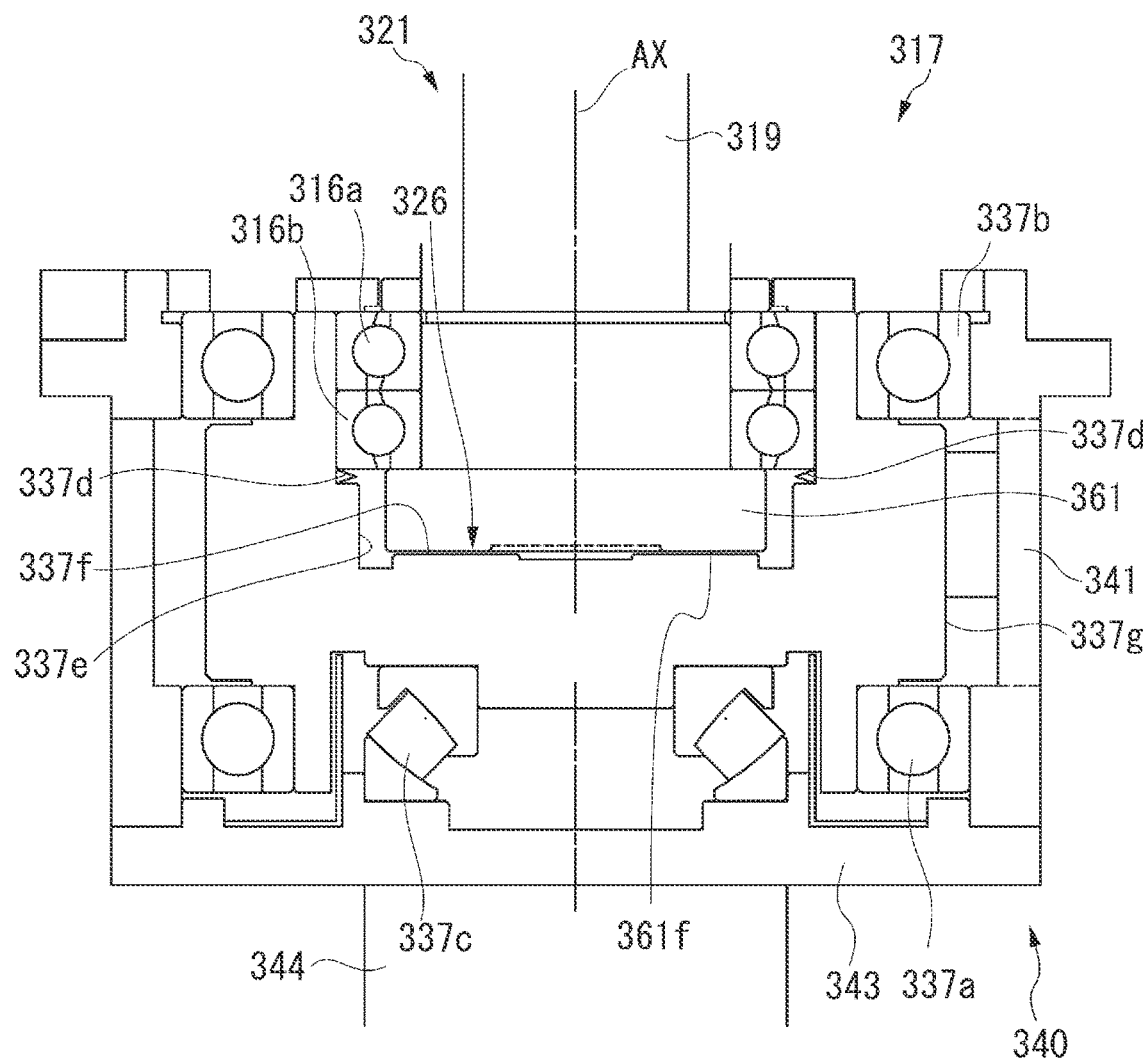
FIG. 11 is a diagram showing a clutch of the fourth example.

FIG. 11 is a diagram showing an enlarged view of a principal part of the ram driver 317, and shows a positional relationship between the screw 319 and the drive rotation body 337. FIG. 11 shows a state where the screw 319 and the drive rotation body 337 are coupled with each other by the clutch 326. As shown in FIG. 11, an elastic member 337d is arranged between the bearing 316b and the drive rotation body 337. The elastic member 337d exerts an elastic force in directions of separating the screw 319 and the drive rotation body 337 from each other in the vertical direction. The elastic member 337d separates, by the elastic force, the screw 319 and the drive rotation body 337 from each other when the clutch 326 is disengaged.

Next, a method of performing press work by the press brake 310 will be described. First, as with the first example, the workpiece W is positioned on the lower tool 12 in the state where the upper tool 29 is raised upward. The operation after the positioning of the workpiece W is the same as that of the timing chart of the first example shown in FIG. 6(A). After having positioned the workpiece W, the screw 319 is rotated at high speed by the first motor 22. At this time, a clearance is present between the drive rotation body 337 and the disc-shaped member 361. Therefore, the screw 319 is rotated at high speed by the driving force of the first motor 22, and the rotation of the screw 319 is not transmitted to the drive rotation body 337. The high-speed rotation of the screw 319 causes the screw 319 to descend at high speed, and the descent of the screw 319 causes the ram 27 coupled with the screw 319 to descend. At this time, the first motor 22 fixed to the ram 27 by the fixture 322b and the second motor 24 fixed to the ram 27 by the fixture 324b descend integrally with the ram 27. Therefore, the relative positions of the first motor 22 and the second motor 24 are maintained constant.

Thereafter, the rotation speed of the first motor 22 is gradually reduced, and the descending speed of the ram 27 is lowered. That is to say, the controller 15 (see FIG. 1) controls the first motor 22 so that the rotation speed of the screw 319 is reduced to the rotation speed of the drive rotation body 337 being rotated or scheduled to be rotated at low speed by the second motor 24. Meanwhile, driving of the second motor 24 is started. An adjustment is made so that the rotation speed of the first motor 22 and the rotation speed of the second motor 24 are matched or substantially matched before the ram 27 reaches a predetermined target position (before the upper tool 29 reaches the workpiece W). As a result of this adjustment, the first motor 22 and the second motor 24 rotate synchronously before the ram 27 reaches the predetermined target position. At this stage, a clearance is created by the elastic member 337d between the disc-shaped member 361 and the drive rotation body 337, and the disc-shaped member 361 and the drive rotation body 337 are rotating at the same rotation speed while being apart from each other.

The ram 27 is lowered at low speed by the driving of the first motor 22, and the upper tool 29 is brought into contact with the workpiece W. After the upper tool 29 has come into contact with the workpiece W, the upper tool 29 further descends and, as a result, the upper tool 29 receives a reaction force from the workpiece W. The drive rotation body 337 is pushed upward by this reaction force via the ram 27 and the case 340, and moves upward against the elastic force of the elastic member 337d. As a result of the drive rotation body 337 being pushed upward, in the bearings 316a, 316b, which are ball bearings rotatably supporting the screw 319, an outer ring thereof moves upward with respect to an inner ring thereof, or a part or the entire bearings 316a, 316b deforms elastically. The upward movement of the outer ring causes the drive rotation body 337 to move upward, and the disc-shaped member 361 and the driving rotary body 337 are coupled with each other (see FIG. 11). That is to say, the screw 319 and the drive rotation body 337 are coupled by the clutch 326 and become integrated into a rotating body. Therefore, by rotating the drive rotation body 337 by the second motor 24, the rotation of the drive rotation body 337 is transmitted to the screw 319 via the disc-shaped member 361, and rotation (driving force) can be given to the screw 319. At this time, since the rotation speeds of the screw 319 and the drive rotation body 337 are the same or substantially the same, the disc-shaped member 361 and the drive rotation body 337 are coupled smoothly in a short length of time without stopping the rotation of the screw 319 and the drive rotation body 337. In the above description, the drive rotation body 337 is moved upward by the positional change between the inner ring and the outer ring of the bearings 316a, 316b or by the elastic deformation of the bearings 316a, 316b. However, this disclosure is not limited to this configuration. For example, the bearing 316a, 316b may be formed movable upward and downward with respect to the drive rotation body 337 or the screw 319 so that the drive rotation body 337 moves upward and downward together with the bearings 316a, 316b, or the drive rotation body 337 may move upward and downward with respect to the bearings 316a, 316b.

As a result of the screw 319 and the drive rotation body 337 having been coupled, the screw 319 rotates in a state where the driving force of the first motor 22 and the driving force of the second motor 24 are applied thereto. The rotation of the screw 319 causes the screw 319 to descend at low speed and with high torque, and the workpiece W is sandwiched between the upper tool 29 and the lower tool 12 as the upper tool 29 reaches the bottom dead center to thereby perform bending work on the workpiece W. From the moment when the upper tool 29 came into contact with the workpiece W to the moment it reaches the bottom dead center, the load required to perform the work on the workpiece W is distributed to the first motor 22 and the second motor 24, respectively. Therefore, it is possible to reduce the output and size of the second motor 24. The reaction force of the workpiece W at the time of performing the work thereon is transmitted from the ram 27 to the frame 11 via the case 340, the drive rotation body 337, the screw 319, and the nut 320, and is received by the frame 11. After a predetermined length of time has elapsed after the upper tool 29 reached the bottom dead center, the driving of the first motor 22 and the second motor 24 is stopped.

After having stopped the driving of the first motor 22 and the second motor 24, the first motor 22 and the second motor 24 are synchronously driven to rotate at the same or substantially the same rotation speed, and the screw 319 is rotated in reverse to thereby move the screw 319 upward. As a result of the screw 319 ascending, the pressure on the workpiece W is released and then the upper tool 29 separated from the workpiece W.

Since the reaction force from the workpiece W acting on the upper tool 29 is removed as a result of the upper tool 29 having been separated from the workpiece W, the upward pressing force on the drive rotation body 337 is removed. As the pressing force is removed, the drive rotation body 337 is moved downward by the load of the ram 27 and the elastic force of the elastic member 337d, and becomes distanced downward from the disc-shaped member 361. By utilizing not only the load of the ram 27 but also the elastic force of the elastic member 337d, it is possible to reliably separate the drive rotation body 337 from the disc-shaped member 361 and reliably perform disengaging by the clutch 326. As a result of the drive rotation body 337 moving away from the disc-shaped member 361 and the clearance having been created between the disc-shaped member 361 and the drive rotation body 337, the driving force from the second motor 24 is cut off and the screw 319 is now rotated by the driving force of the first motor 22.

Thereafter, by gradually increasing the rotation speed of the first motor 22, the screw 319 is raised at high speed by the high-speed rotation of the first motor 22. The ascent of the screw 319 causes the ram 27 to return to the original position thereof. After the ram 27 has returned to the original position, the first motor 22 is stopped. On the other hand, the driving of the second motor 24 is stopped after the drive rotation body 337 has separated from the disc-shaped member 361. When the ram 27 has returned to the original position and operation of the first motor 22 and the second motor 24 has been stopped, operation of the press brake 310 is completed.

As described above, in the press brake 310 according to the fourth example, as with the first example, the relative positions of the first motor 22 and the second motor 24 are maintained. Therefore, there is no need for a guiding mechanism to guide one of the first motor 22 and the second motor 24, and an increase in cost can be suppressed. Furthermore, it is possible to reduce the length of time required to perform work on the workpiece W and miniaturize the second motor 24.

FIFTH EXAMPLE

Figure 12:
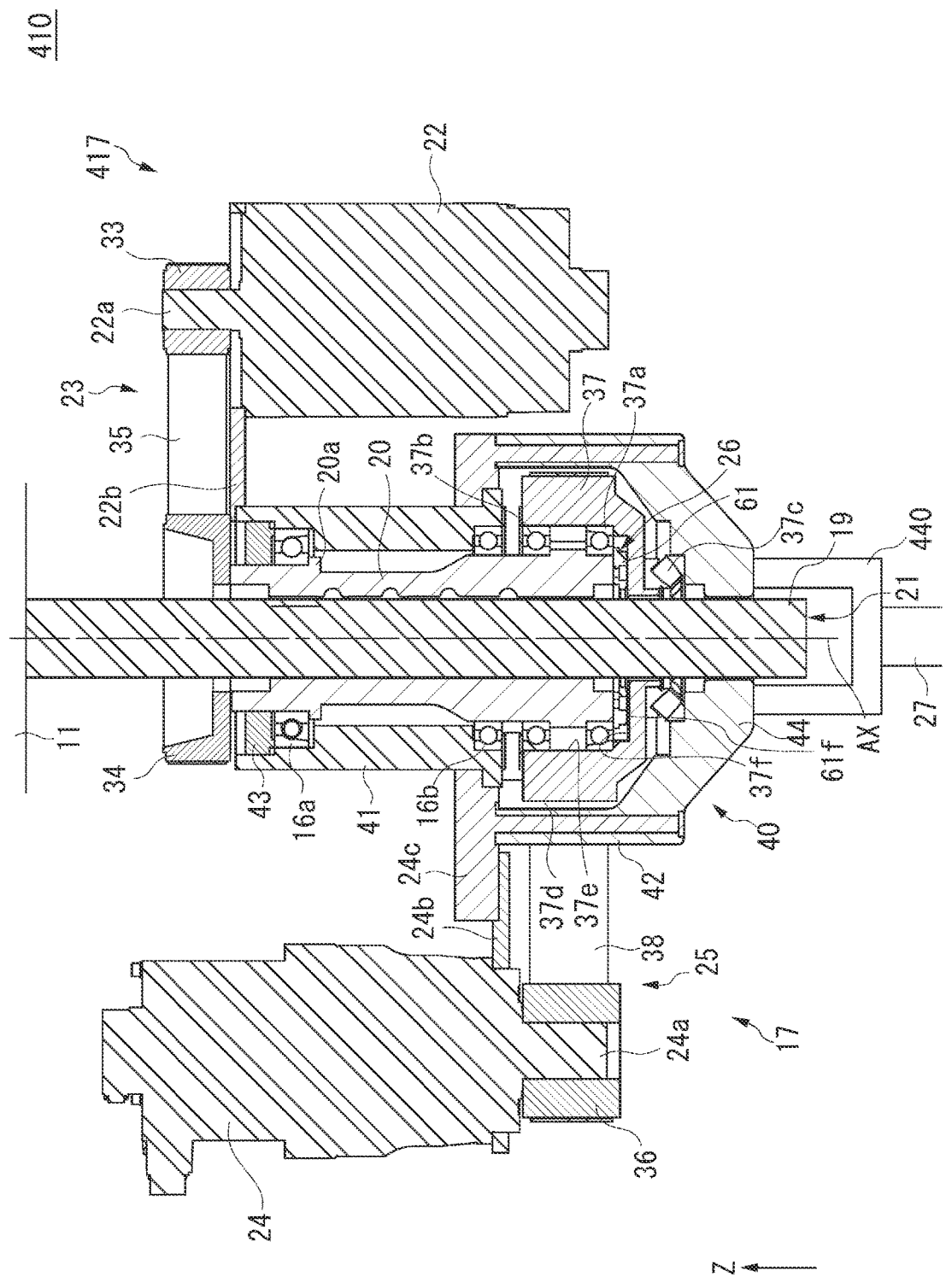
FIG. 12 is a diagram describing a ram driver of a press brake of a fifth example.

Hereinafter, a fifth example is described with reference to FIG. 12. FIG. 12 is a diagram describing a principal part of a press brake according to the fifth example. In FIG. 12, a ram driver 417 of a press brake 410 is shown, and the configuration other than the ram driver 417 is the same as that of the first example shown in FIGS. 1 to 5. In this example, the same configurations as those in the first example are assigned with the same symbols and the descriptions thereof are omitted or simplified. In this example, there is applied a configuration with the same constituents as those in the first example in which rotation and movement in the vertical direction of the screw 19 are restricted, the nut 20 is held by the ram 27, and the nut 20 moves together with the ram 27 in the vertical direction by rotating the nut 20.

As shown in FIG. 12, as with the first example, the ram driver 417 includes: the ball screw 21 having the screw 19 and the nut 20; the first motor 22; the first power transmitter 23; the second motor 24; the second power transmitter 25; and the clutch 26. The ram driver 417 is substantially equal to the vertically inverted configuration of the ram driver 17 of the first example. However, the screw 19 is fixed to the frame 11 at the upper end thereof, and the rotation and the vertical movement of the screw 19 are restricted. The case 40 is fixed to the ram 27 via a coupling member 440. The first motor 22 is fixed to the case 40 by the fixture 22b. The second motor 24 is fixed to the case 40 by the fixture 24b and a fixture 24c.

Thus, in this example, as with the third example, the first motor 22 and the second motor 24 are supported on the frame 27, respectively, and the relative positions of the first motor 22 and the second motor 24 are maintained while they move together with the ram 27 in the vertical direction. Further, since the first motor 22 and the second motor 24 are fixed to the ram 27, there is no need for a guide to guide the movement in the vertical direction. However, there may be provided a guide to guide one or both of the first motor 22 and the second motor 24.

A method of performing press work by the press brake 410 is such that after having positioned the workpiece W first, the nut 20 is rotated at high speed by the first motor 22. A clearance (see the clearance L1 of FIG. 4) is present between the drive rotation body 37 of the second power transmitter 25 and the annular member 61. Accordingly, the nut 20 is rotated at high speed by the driving force of the first motor 22, and the rotation of the nut 20 is not transmitted to the drive rotation body 37. Therefore, the high-speed rotation of the nut 20 causes the nut 20 to descend at high speed. As the nut 20 descends, the ram 27 descends at high speed. At this time, the first motor 22 and the second motor 24 descend integrally with the ram 27, and the relative positions of the first motor 22 and the second motor 24 are maintained constant.

Thereafter, the rotation speed of the first motor 22 is gradually reduced, and the descending speed of the ram 27 is lowered. Meanwhile, driving of the second motor 24 is started. An adjustment is made so that the rotation speed of the nut 20 by the first motor 22 and the rotation speed of the drive rotation body 37 by the second motor 24 are matched or substantially matched before the upper tool 29 reaches the workpiece W. As a result of this adjustment, the nut 20 and the drive rotation body 37 now rotate synchronously. At this stage, the clearance is present between the annular member 61 and the drive rotation body 37, and the annular member 61 and the drive rotation body 37 are rotating at the same rotation speed while being apart from each other.

When the ram 27 is lowered by the low-speed driving of the first motor 22 and the upper tool 29 comes in contact with the workpiece W, the upper tool 29 receives a reaction force from the workpiece W. The case 40 is pushed upward by this reaction force via the ram 27 and the coupling member 440. The thrust bearing 37c is arranged between the second cover 44 of the case 40 and the drive rotation body 37. When the case 40 is pushed upward, the drive rotation body 37 is pushed upward, and the annular member 61 and the drive rotation body 37 are coupled with each other. At this time, since the rotation speeds of the nut 20 and the drive rotation body 37 are the same or substantially the same, the annular member 61 and the drive rotation body 37 are coupled smoothly in a short length of time without stopping the rotation of the nut 20 and the drive rotation body 37.

As a result of the annular member 61 and the drive rotation body 37 having been coupled, the nut 20 rotates in a state where the driving force of the first motor 22 and the driving force of the second motor 24 are applied thereto. The workpiece W is sandwiched between the upper tool 29 and the lower tool 12 and the bending work is performed while the nut 20 is lowered at low speed and the upper tool 29 is reaching the bottom dead center as a result of the rotation of the nut 20 by the first motor 22 and the second motor 24. The load required to perform the work on the workpiece W is distributed to the first motor 22 and the second motor 24, respectively. Therefore, it is possible to reduce the output and size of the second motor 24. The reaction force of the workpiece W at the time of performing the work thereon is transmitted from the ram 27 to the frame 11 via the case 40, the drive rotation body 37, the nut 20, and the screw 19, and is received by the frame 11. After a predetermined length of time has elapsed after the upper tool 29 reached the bottom dead center, the driving of the first motor 22 and the second motor 24 is stopped.

After having stopped the driving of the first motor 22 and the second motor 24, the first motor 22 and the second motor 24 are synchronously driven to rotate at the same or substantially the same rotation speed, and the nut 20 is rotated in reverse to thereby move the nut 20 upward. As a result of the nut 20 (the ram 27) ascending, the pressure on the workpiece W is released and then the upper tool 29 is separated from the workpiece W. Since the reaction force from the workpiece W acting on the upper tool 29 is removed as a result of the upper tool 29 having been separated from the workpiece W, the upward pressing force on the drive rotation body 37 is removed. As the pressing force is removed, the drive rotation body 37 is moved downward by the load of the ram 27, and becomes distanced downward from the annular member 61. As a result of the clearance having been created between the annular member 61 and the drive rotation body 37, the driving force from the second motor 24 is cut off and the nut 20 is now rotated by the driving force of the first motor 22.

Thereafter, by gradually increasing the rotation speed of the first motor 22, the nut 20 rotates at high speed and ascends at high speed. After the ram 27 has returned to the original position as a result of the nut 20 having ascended, the first motor 22 is stopped. On the other hand, the driving of the second motor 24 is stopped after the drive rotation body 37 has separated from the annular member 61. When the ram 27 has returned to the original position and operation of the first motor 22 and the second motor 24 has been stopped, operation of the press brake 410 is completed.

As described above, in the press brake 410 according to the fifth example, as with the first example, the relative positions of the first motor 22 and the second motor 24 are maintained. Therefore, there is no need for a guiding mechanism to guide one of the first motor 22 and the second motor 24, and an increase in cost can be suppressed. Furthermore, it is possible to reduce the length of time required to perform work on the workpiece W and miniaturize the second motor 24.

SIXTH EXAMPLE

Figure 13:
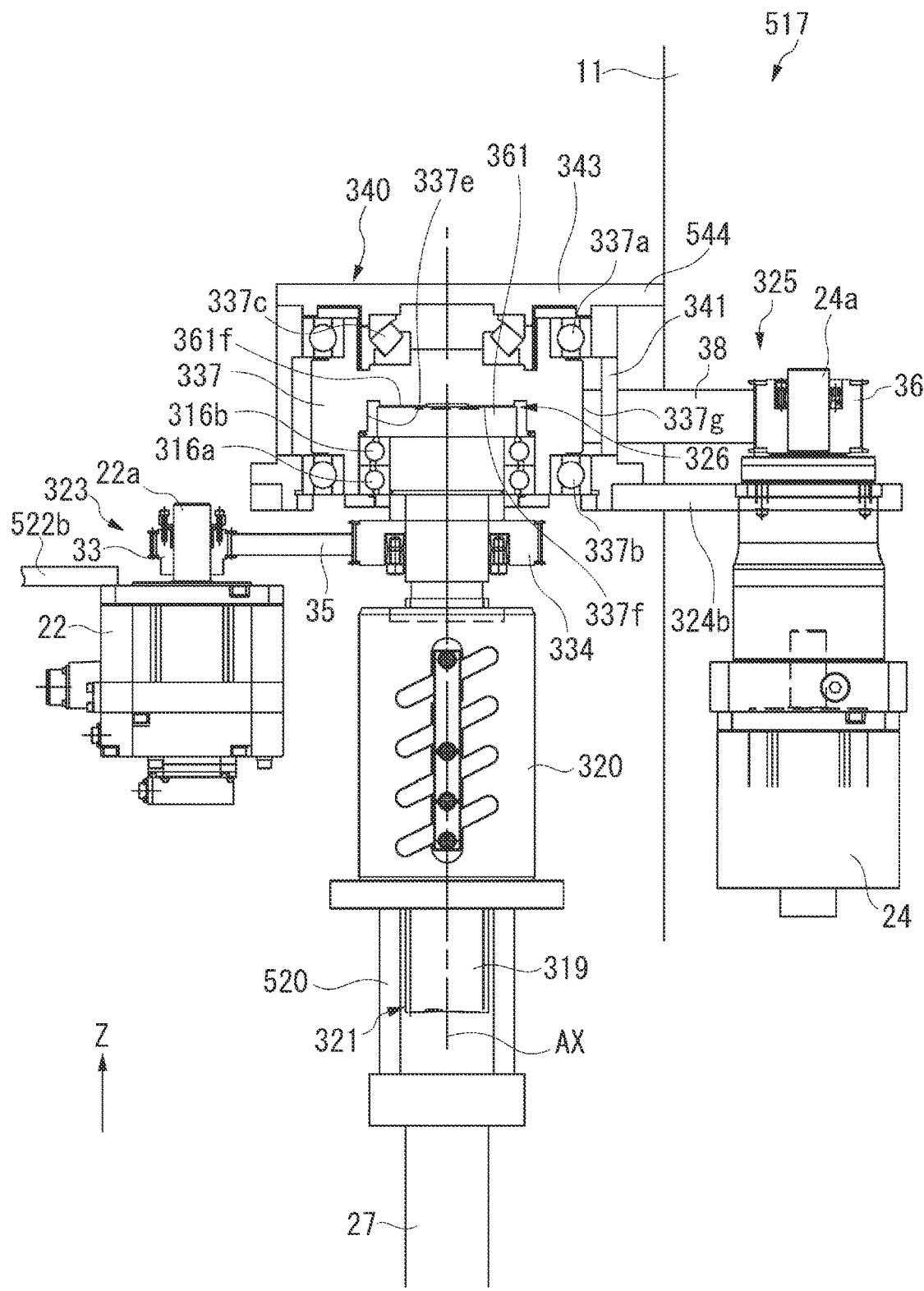
FIG. 13 is a diagram describing a ram driver of a press brake of a sixth example.

Hereinafter, a sixth example is described with reference to FIGS. 13 and 14. FIG. 13 is a diagram describing a principal part of a press brake according to the sixth example. In FIG. 13, a ram driver 517 of a press brake 510 is shown, and the configuration other than the ram driver 517 is the same as that of the fourth example shown in FIG. 10. In this example, the same configurations as those in the fourth example are assigned with the same symbols and the descriptions thereof are omitted or simplified. In this example, there is described a configuration with the same constituents as those in the fourth example in which the nut 320 is moved together with the ram 27 in the vertical direction by coupling the nut 320 with the ram 27 and rotating the screw 319.

As shown in FIG. 13, as with the fourth example, the ram driver 517 includes: the ball screw 321 having the screw 319 and the nut 320; the first motor 22; the first power transmitter 323; the second motor 24; the second power transmitter 325; and the clutch 326. The ram driver 517 is substantially equal to the vertically inverted configuration of the ram driver 317 of the fourth example. However, the lower end of the nut 320 is fixed to the ram 27 via a connecting member 520, and the nut 320 moves in the vertical direction together with the ram 27 while rotation thereof being restricted.

The case 340 that accommodates the drive rotation body 337 is fixed to the frame 11 via a coupler 544 extending horizontally from the cover 343. The upper part of the screw 319 is rotatably supported by the accommodating part 337e of the drive rotation body 337 in the case 340, and the vertical movement thereof is restricted. The screw 319 is arranged in a state of being suspended from the case 340 via the drive rotation body 337. The first motor 22 is fixed to the frame 11 in a fixed state by a fixture 522b. The first motor 24 is fixed to the case 340 by the fixture 324b, and is supported by the frame 11 via the case 340. As described above, in this example, as with the first example, the first motor 22 and the second motor 24 are supported on the frame 11, respectively so that the relative positions of the first motor 22 and the second motor 24 are maintained.

Figure 14:
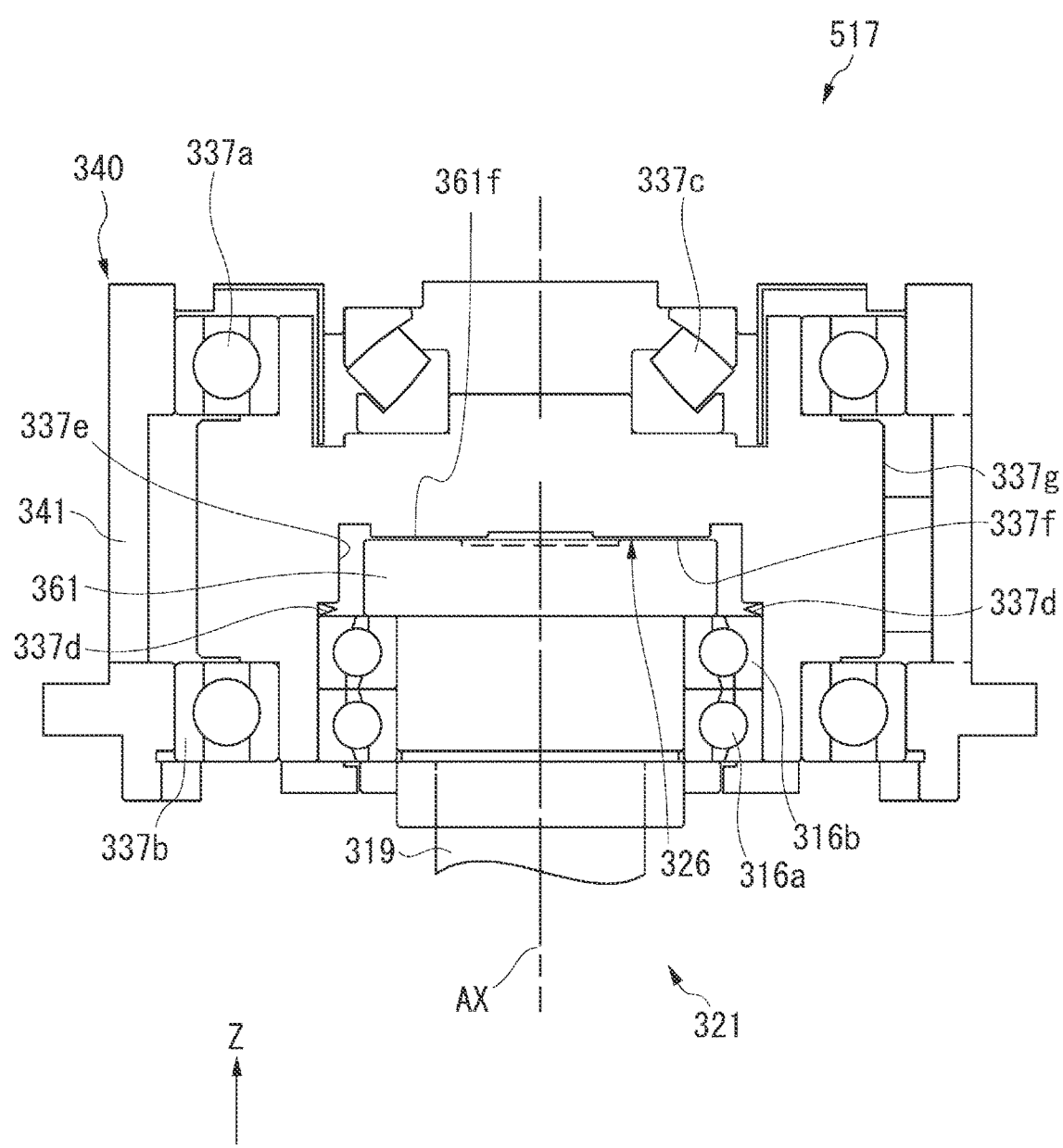
FIG. 14 is a diagram showing a clutch of the sixth example.

FIG. 14 is a diagram showing an enlarged view of a principal part of the ram driver 517, and shows a positional relationship between the screw 319 and the drive rotation body 337. As shown in FIG. 14, an elastic member 337d is arranged between the bearing 316b and the drive rotation body 337. The elastic member 337d exerts an elastic force in directions of separating the screw 319 and the drive rotation body 337 from each other in the vertical direction. The elastic member 337d separates, by the elastic force, the screw 319 and the drive rotation body 337 from each other when the clutch 326 is disengaged.

A method of performing press work by the press brake 510 is such that after having positioned the workpiece W first, the screw 319 is rotated at high speed by the first motor 22. A clearance (see the clearance L1 of FIG. 4) is present between the drive rotation body 337 of the second power transmitter 325 and the disc-shaped member 361. Accordingly, the screw 319 is being rotated at high speed by the driving force of the first motor 22, and the rotation of the screw 319 is not transmitted to the drive rotation body 337. Therefore, the high-speed rotation of the screw 319 causes the nut 320 to descend at high speed. As the nut 320 descends, the ram 27 descends at high speed. At this time, since the first motor 22 and the second motor 24 are supported by the frame 11, the relative positions of the first motor 22 and the second motor 24 are maintained constant.

Thereafter, the rotation speed of the first motor 22 is gradually reduced, and the descending speed of the ram 27 is lowered. Meanwhile, driving of the second motor 24 is started. An adjustment is made so that the rotation speed of the screw 319 by the first motor 22 and the rotation speed of the drive rotation body 337 by the second motor 24 are matched or substantially matched before the ram 27 reaches a predetermined target position (before the upper tool 29 reaches the workpiece W). As a result of this adjustment, the screw 319 and the drive rotation body 337 now rotate synchronously. At this stage, a clearance is created by the load of the ram 27 and the elastic force of the elastic member 337d between the disc-shaped member 361 and the drive rotation body 337, and the disc-shaped member 361 and the drive rotation body 337 are rotating at the same rotation speed while being apart from each other.

When the ram 27 is lowered at low speed by the driving of the first motor 22 and the upper tool 29 comes in contact with the workpiece W, the upper tool 29 receives a reaction force from the workpiece W. The screw 319 is pushed upward by this reaction force via the ram 27 and the nut 320, and moves upward against the elastic force of the elastic member 337d. The upward movement of the screw 319 causes the disc-shaped member 361 and the driving rotary body 337 to be coupled with each other (see FIG. 14). As a result of the screw 319 being pushed upward, in the bearings 316a, 316b, which are ball bearings rotatably supporting the screw 319, an inner ring thereof moves upward with respect to an outer ring thereof, or a part or the entire bearings 316a, 316b deforms elastically. At this time, since the rotation speeds of the screw 319 and the drive rotation body 337 are the same or substantially the same, the disc-shaped member 361 and the drive rotation body 337 are coupled smoothly in a short length of time without stopping the rotation of the screw 319 and the drive rotation body 337.

As a result of the screw 319 and the drive rotation body 337 having been coupled, the screw 319 rotates in a state where the driving force of the first motor 22 and the driving force of the second motor 24 are applied thereto. The rotation of the screw 319 causes the nut 320 to descend at low speed and with high torque, and the workpiece W is sandwiched between the upper tool 29 and the lower tool 12 as the upper tool 29 reaches the bottom dead center to thereby perform bending work on the workpiece W. From the moment when the upper tool 29 contacts the workpiece W to the moment it reaches the bottom dead center, the load required to perform the work on the workpiece W is distributed to the first motor 22 and the second motor 24 respectively. Therefore, it is possible to reduce the output and size of the second motor 24.

The reaction force of the workpiece W at the time of performing the work thereon is transmitted from the ram 27 to the nut 320, the screw 319, and the drive rotation body 337, and is received by the thrust bearing 337c of the case 340 fixed to the frame 11. The thrust bearing 337c is a reaction force receiver. After a predetermined length of time has elapsed after the upper tool 29 reached the bottom dead center, the driving of the first motor 22 and the second motor 24 is stopped. After having stopped the driving of the first motor 22 and the second motor 24, the first motor 22 and the second motor 24 are synchronously driven to rotate at the same or substantially the same rotation speed, and the screw 319 is rotated in reverse to thereby move the nut 320 upward. As a result of the nut 320 (the ram 27) ascending, the pressure on the workpiece W is released and then the upper tool 29 is separated from the workpiece W.

Since the reaction force from the workpiece W acting on the upper tool 29 is removed as a result of the upper tool 29 having been separated from the workpiece W, the upward pressing force on the screw 319 is removed. As the pressing force is removed, the screw 319 is moved downward by the load of the ram 27 and the elastic force of the elastic member 337d, and becomes distanced downward from the drive rotation body 337. By utilizing not only the load of the ram 27 but also the elastic force of the elastic member 337d, it is possible to reliably separate the screw 319 from the drive rotation body 337 and reliably perform disengaging by the clutch 326. As a result of the screw 319 having separated from the drive rotation body 337 and the clearance having been created between the disc-shaped member 361 and the drive rotation body 337, the driving force from the second motor 24 is cut off and the screw 319 is now rotated by the driving force of the first motor 22.

Thereafter, by gradually increasing the rotation speed of the screw 319 by the first motor 22, the nut 320 ascends at high speed. The ascent of the nut 320 causes the ram 27 to return to the original position thereof. After the ram 27 has returned to the original position, the first motor 22 is stopped. On the other hand, the driving of the second motor 24 is stopped after the drive rotation body 337 has separated from the disc-shaped member 361. When the ram 27 has returned to the original position and the operation of the first motor 22 and the second motor 24 has been stopped, the operation of the press brake 510 is completed.

As described above, in the press brake 510 according to the sixth example, as with the first example, the relative positions of the first motor 22 and the second motor 24 are maintained. Therefore, there is no need for a guiding mechanism to guide one of the first motor 22 and the second motor 24, and an increase in cost can be suppressed. Furthermore, it is possible to reduce the length of time required to perform work on the workpiece W and miniaturize the second motor 24.

Examples have been described above. However, this disclosure is not limited to the above description, and various modifications may be made without departing from the scope of the disclosure. One or more of the structures described in the above examples may be appropriately combined. In the examples described above, the ram 27 holds the upper tool 29 and the upper tool 29 is moved in the vertical direction to thereby perform bending work on the workpiece W. However, instead of this configuration, the ram 27 may hold the lower tool 12 and the lower tool 12 may be moved in the vertical direction by the ram driver 17 to thereby perform bending work on the workpiece W.

The constituents described in each of the above examples may be applied if applicable to other examples. For example, the driver 62 and the sensor 63 described in the second example, the splines 219a and the spline nut 65 described in the third example may be applied to the fourth to the sixth examples if applicable thereto. In applying the driver 62 to the fourth example, a driving section 62 that moves the drive rotation body 337 upward with respect to the case 340 is applied, for example. In applying the driver 62 to the sixth example, a driving section 62 that moves the screw 319 upward with respect to the case 340 is applied, for example. In addition, the contents of Japanese Patent Application No. 2016-210724 and all documents cited in the detailed description are incorporated herein by reference to the extent permitted by law.

The invention claimed is:

1. A press brake that performs bending work on a workpiece by holding the workpiece between an upper tool and a lower tool, the press brake comprising:
   a ram to which the upper tool or the lower tool can be attached;
   a ram driver that moves the ram upward and downward; and
   a controller that controls the ram driver, wherein the ram driver includes:
   a rotation/linear motion converter composed of a screw fixed to the ram and moves upward and downward as the ram moves upward and downward, and a nut screw-coupled with the screw;
   a drive rotation body arranged apart from the nut in an axial direction of the screw and arranged rotatably about a rotation axis of the nut;
   a first motor arranged in a fixed state;
   a first power transmitter that transmits rotation of the first motor to the nut at high speed and with low torque;
   a second motor arranged in a fixed state;
   a second power transmitter that transmits rotation of the second motor to the drive rotation body at low speed and with high torque; and
   a clutch provided between the nut and the drive rotation body and that couples the nut and the drive rotation body into an integrated rotation body.

2. The press brake according to claim 1, wherein
   the controller includes a synchronous rotation controller that controls the first motor so that the upper tool or the lower tool descends within a range that includes at least a part of an approaching-workpiece stroke among strokes including the approaching-workpiece stroke, a contacting-workpiece stroke, and an ending-bending-work stroke, and
   matches a rotation speed of the nut being rotated by the first motor with a rotation speed of the drive rotation body being rotated by the second motor, during the approaching-workpiece stroke to couple the nut and the drive rotation body by the clutch after the synchronous rotation controller has matched the rotation speed of the nut with the rotation speed of the drive rotation body.

3. The press brake according to claim 2, wherein the synchronous rotation controller controls the first motor so that the rotation speed of the nut is reduced to the rotation speed of the drive rotation body being rotated or scheduled to be rotated at low speed by the second motor.

4. The press brake according to claim 1, wherein the drive rotation body has an accommodating part that accommodates at least a part of the nut; an outer circumferential part thereof is a power receiver that receives power transmitted from the second power transmitter; and an inner circumferential part thereof is opposed to a part of an outer circumferential part of the nut via a bearing, and the drive rotation body is rotatably supported in an axial direction thereof via a reaction force receiver held on a frame arranged in a fixed state.

5. The press brake according to claim 1, wherein the controller has a use/non-use selector that selects between use and non-use of the clutch.

6. The press brake according to claim 1, wherein the clutch couples the nut and the drive rotation body by reaction force generated when work is performed on a workpiece.

7. The press brake according to claim 1, wherein the clutch includes a driver that moves at least one of the nut and the drive rotation body, which are apart from each other, to couple the nut and the drive rotation body.

8. A press brake that performs bending work on a workpiece by holding the workpiece between an upper tool and a lower tool, the press brake comprising:
   a ram to which the upper tool or the lower tool can be attached;
   a frame installed on a floor surface and that guides the ram in a vertical direction;
   a ram driver that moves the ram upward and downward; and
   a controller that controls the ram driver, wherein the ram driver includes:
   a rotation/linear motion converter composed of a screw and a nut screw-coupled with the screw, one of the screw and the nut is fixed to the ram, and the other one of the screw and the nut is fixed to the frame;
   a first motor fixed to the ram or the frame;
   a second motor fixed to the ram or the frame, to which the first motor is fixed;
   a drive rotation body arranged apart in an axial direction of the screw from the nut or the screw rotated by the first motor while being able to rotate about a rotation axis of the nut or the screw, and is rotated by the second motor; and
   a clutch provided between the nut or the screw rotated by the first motor and the drive rotation body, and couples the nut or the screw and the drive rotation body into an integrated rotation body.

9. The press brake according to claim 2, wherein
   the drive rotation body has an accommodating part that accommodates at least a part of the nut; an outer circumferential part thereof is a power receiver that receives power transmitted from the second power transmitter; and an inner circumferential part thereof is opposed to a part of an outer circumferential part of the nut via a bearing, and
   the drive rotation body is rotatably supported in an axial direction thereof via a reaction force receiver held on a frame arranged in a fixed state.

10. The press brake according to claim 3, wherein
    the drive rotation body has an accommodating part that accommodates at least a part of the nut; an outer circumferential part thereof is a power receiver that receives power transmitted from the second power transmitter; and an inner circumferential part thereof is opposed to a part of an outer circumferential part of the nut via a bearing, and
    the drive rotation body is rotatably supported in an axial direction thereof via a reaction force receiver held on a frame arranged in a fixed state.

11. The press brake according to claim 2, wherein the clutch couples the nut and the drive rotation body by reaction force generated when work is performed on a workpiece.

12. The press brake according to claim 3, wherein the clutch couples the nut and the drive rotation body by reaction force generated when work is performed on a workpiece.

13. The press brake according to claim 4, wherein the clutch couples the nut and the drive rotation body by reaction force generated when work is performed on a workpiece.

14. The press brake according to claim 5, wherein the clutch couples the nut and the drive rotation body by reaction force generated when work is performed on a workpiece.

15. The press brake according to claim 2, wherein the clutch includes a driver that moves at least one of the nut and the drive rotation body, which are apart from each other, to couple the nut and the drive rotation body.

16. The press brake according to claim 3, wherein the clutch includes a driver that moves at least one of the nut and the drive rotation body, which are apart from each other, to couple the nut and the drive rotation body.

17. The press brake according to claim 4, wherein the clutch includes a driver that moves at least one of the nut and the drive rotation body, which are apart from each other, to couple the nut and the drive rotation body.

18. The press brake according to claim 5, wherein the clutch includes a driver that moves at least one of the nut and the drive rotation body, which are apart from each other, to couple the nut and the drive rotation body.

* * * * *